US012659139B2

(12) United States Patent
Kelly et al.

(10) Patent No.: US 12,659,139 B2
(45) Date of Patent: Jun. 16, 2026

(54) COMPUTERIZED SYSTEMS AND METHODS FOR A MULTI-FACETED ENCRYPTION PLATFORM

(71) Applicant: Identikey, LLC, Leander, TX (US)

(72) Inventors: Kevin James Kelly, Austin, TX (US); Gregory Joe Owen, Leander, TX (US)

(73) Assignee: IDENTIKEY, LLC, Leander, TX (US)

( * ) Notice: Subject to any disclaimer, the term of this patent is extended or adjusted under 35 U.S.C. 154(b) by 37 days.

(21) Appl. No.: 18/860,914

(22) PCT Filed: Apr. 28, 2023

(86) PCT No.: PCT/US2023/066371
§ 371 (c)(1),
(2) Date: Oct. 28, 2024

(87) PCT Pub. No.: WO2023/212700
PCT Pub. Date: Nov. 2, 2023

(65) Prior Publication Data
US 2025/0158807 A1 May 15, 2025

Related U.S. Application Data

(60) Provisional application No. 63/335,869, filed on Apr. 28, 2022.

(51) Int. Cl.
*H04L 9/08* (2006.01)
*G06F 21/62* (2013.01)
(Continued)

(52) U.S. Cl.
CPC ........ *H04L 9/0838* (2013.01); *G06F 21/6218* (2013.01); *H04L 9/0891* (2013.01);
(Continued)

(58) Field of Classification Search
CPC ..... G06F 21/6218; H04L 9/14; H04L 9/0891; H04L 9/0838; H04L 9/32; H04L 63/0281
See application file for complete search history.

(56) References Cited

U.S. PATENT DOCUMENTS

| | | | |
|---|---|---|---|
| 7,757,297 B2 * | 7/2010 | Herberth | G06F 21/6218 726/28 |
| 11,526,281 B1 * | 12/2022 | Valkaitis | G06F 21/6218 |

(Continued)

OTHER PUBLICATIONS

Reddy, P. Muthi, S. H. Manjula, and K. R. Venugopal. "Secured privacy data using multi key encryption in cloud storage." 2018 Fifth International Conference on Emerging Applications of Information Technology (EAIT). IEEE, 2018, pp. 1-4) (Year: 2018).*

(Continued)

*Primary Examiner* — Kari L Schmidt
(74) *Attorney, Agent, or Firm* — Dickinson Wright PLLC; Ross Spencer Garsson

(57) ABSTRACT

Disclosed are systems and methods for a computerized framework that provides advanced privacy and security solutions to computer networks and the data housed and transferred therein. The disclosed framework provides multi-key encryption over a distributed, secure architecture that operates by protecting and ensuring the authorized use of an individual or entity's data. The disclosed computerized functionality can validate that a request for, access to and/or usage of private or restricted information is legitimate and approved, whereby approval can be required, provided and/ or requested in real-time (e.g., near-real time and/or substantially simultaneous with the request), and/or or via pre-approved access for a defined period. Therefore, the disclosed framework provides a centralized service for management of user and/or entity data across multiple businesses and service providers via multi-key encryption opera- (Continued)

tions that enable parties to audit control over access to their private, restricted or otherwise confidential data.

24 Claims, 17 Drawing Sheets

(51) Int. Cl.
  *H04L 9/14*          (2006.01)
  *H04L 9/32*          (2006.01)
  *H04L 9/40*          (2022.01)

(52) U.S. Cl.
  CPC .................. *H04L 9/14* (2013.01); *H04L 9/32* (2013.01); *H04L 63/0281* (2013.01)

(56)          References Cited

U.S. PATENT DOCUMENTS

| | | | | | |
|---|---|---|---|---|---|
| 11,631,117 | B2 * | 4/2023 | Schroepfer | ........... | H04L 9/0822 |
| | | | | | 705/26.2 |
| 2002/0099947 | A1 * | 7/2002 | Evans | ................. | G06F 21/6209 |
| | | | | | 713/193 |
| 2003/0120923 | A1 * | 6/2003 | Gilman | ................... | G06F 21/10 |
| | | | | | 713/170 |
| 2009/0083544 | A1 * | 3/2009 | Scholnick | ............. | H04L 9/3231 |
| | | | | | 713/186 |
| 2016/0191513 | A1 * | 6/2016 | Tomlinson | .............. | H04L 9/321 |
| | | | | | 713/168 |
| 2018/0276417 | A1 * | 9/2018 | Cerezo Sanchez | ..... | H04L 9/008 |
| 2019/0158275 | A1 * | 5/2019 | Beck | .................. | G06Q 20/0658 |
| 2019/0332821 | A1 * | 10/2019 | Ebert | .................. | G06F 16/1824 |
| 2020/0104525 | A1 * | 4/2020 | Jäger | .................. | G06F 21/6227 |
| 2020/0151356 | A1 * | 5/2020 | Rohloff | ............... | G06F 21/6245 |
| 2020/0159676 | A1 * | 5/2020 | Durham | ................ | G06F 21/602 |
| 2020/0162252 | A1 * | 5/2020 | Davis | .................... | H04L 9/0872 |
| 2020/0177383 | A1 * | 6/2020 | Iyer | ......................... | G06F 21/44 |
| 2020/0195621 | A1 * | 6/2020 | Li | ......................... | H04L 9/3226 |
| 2022/0004655 | A1 * | 1/2022 | Zhang | ................... | G06F 21/107 |

OTHER PUBLICATIONS

Chen, Hao, et al. "Efficient multi-key homomorphic encryption with packed ciphertexts with application to oblivious neural network inference." Proceedings of the 2019 ACM SIGSAC conference on computer and communications security. 2019, pp. 395-412. ( Year: 2019).*

K. -L. Tsai et al., "Cloud Encryption Using Distributed Environmental Keys," 2016 10th International Conference on Innovative Mobile and Internet Services in Ubiquitous Computing (IMIS), Fukuoka, Japan, 2016, pp. 476-481. (Year: 2016).*

Di Vimercati, Sabrina De Capitani, et al. "A data outsourcing architecture combining cryptography and access control." Proceedings of the 2007 ACM workshop on Computer security architecture. 2007, pp. 63-69. (Year: 2007).*

* cited by examiner

*FIG. 1*

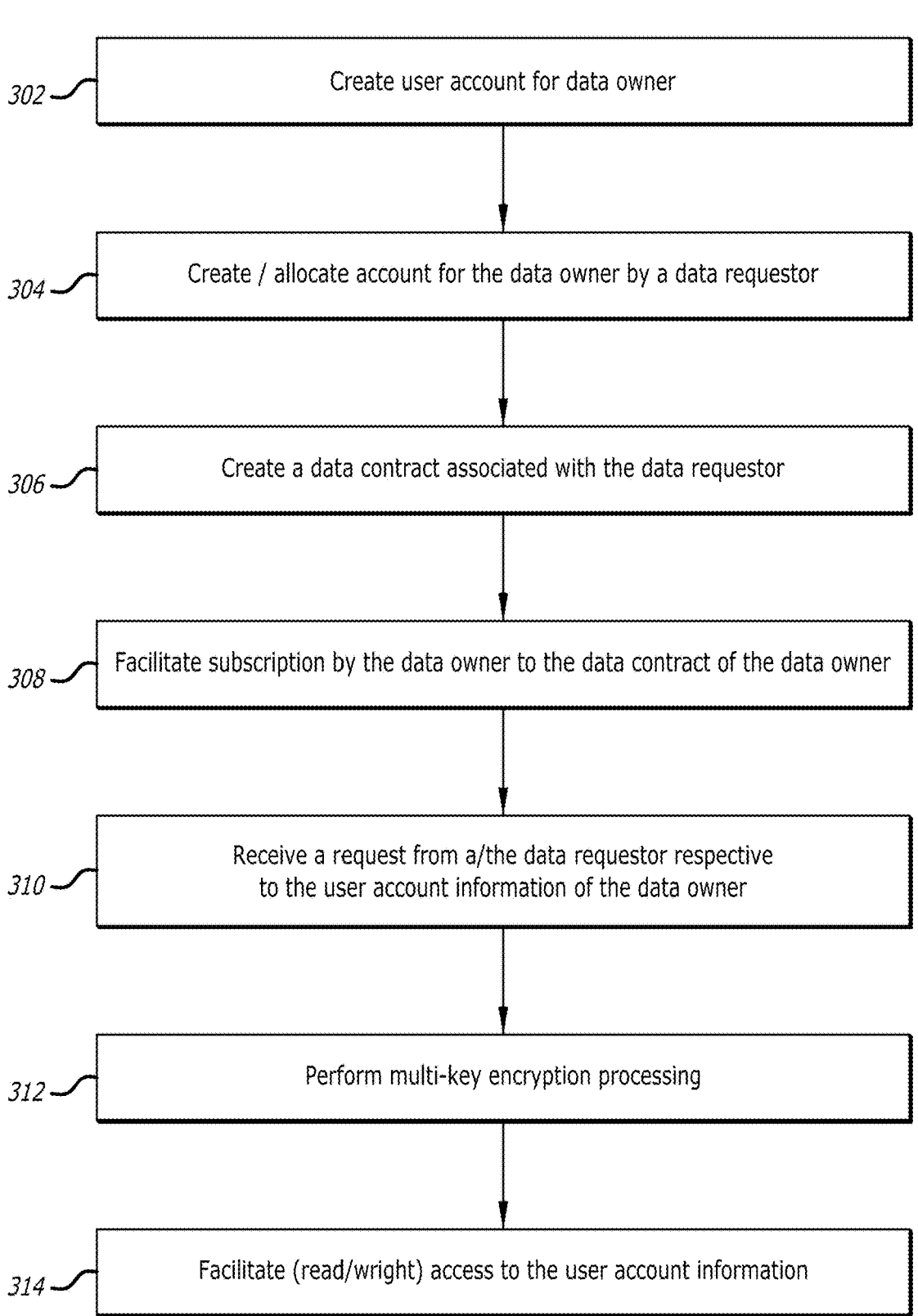

*300*

302 — Create user account for data owner

304 — Create / allocate account for the data owner by a data requestor

306 — Create a data contract associated with the data requestor

308 — Facilitate subscription by the data owner to the data contract of the data owner 310 — Receive a request from a/the data requestor respective to the user account information of the data owner 312 — Perform multi-key encryption processing 314 — Facilitate (read/wright) access to the user account information

FIG. 3

COMPUTERIZED SYSTEMS AND METHODS FOR A MULTI-FACETED ENCRYPTION PLATFORM

CROSS-REFERENCE TO RELATED PATENT APPLICATIONS

This application is a 35 U.S.C § 371 national application of PCT Application No. PCT/US23/66371, filed on Apr. 28, 2023, entitled "Computerized Systems And Methods For A Multi-Faceted Encryption Platform", which claims priority to U.S. Patent Appl. Ser. No. 63/335,869, filed Apr. 28, 2022, entitled "Computerized Systems And Methods For A Multi-Faceted Encryption Platform," and which patent applications are commonly owned by the owner of the present invention. These patent applications are incorporated herein in their entirety.

TECHNICAL FIELD

The present disclosure relates to an encryption platform, and more particularly, towards a multi-key encryption platform that enables parties to audit control over access to their private, restricted or otherwise confidential data.

BACKGROUND

Currently, there are many forms of encryption that enable user data to remain hidden and/or inaccessible to unauthorized users. Existing systems, and the encryption methodologies and mechanisms they implement, are configured for the purposes of protecting private information and sensitive data in order to enhance the security of computerized communications between applications, servers and client devices.

SUMMARY OF THE INVENTION

However, such conventional systems and mechanisms lack the capabilities of providing an end-to-end (E2E) privacy/security solution that can adeptly ensure the security of private information while it is hosted, during communication, and at its destination (by the receiving device, platform or portal) or by an associated user.

The disclosed framework addresses such shortcomings, among others, by providing a novel, computerized security framework that provides multi-key encryption over a distributed, secure architecture. As discussed herein, the disclosed framework operates by protecting and ensuring the authorized use of an individual or entity's data. Thus, an individual or entity can be protected from fraudulent use of their stolen or compromised data.

As such, adoption of the disclosed framework as an operational platform can ensure that individual consumers are protected from fraud and identity theft; and, likewise, business and service providers can be protected from fines, regulatory burdens, and brand damage associated with such, among other benefits.

According to some embodiments, the disclosed systems and methods employ a proprietary multi-key encryption platform that provides non-native functionality for an individual or entity (referred to as "the Data Owner," as discussed below) to audit control and management over access to their private, restricted or otherwise confidential data. The disclosed framework provides computerized functionality for validating that the request for, access to and/or usage of private or restricted information is legitimate and approved by the Data Owner, whereby embodiments exist, as discussed herein, approval can be required, provided and/or requested in real-time (e.g., near-real time and/or substantially simultaneous with the request), and/or or via pre-approved access for a defined period. In some embodiments, as discussed below, a Data Owner can revoke access to private data at any time.

As evidenced from the disclosure herein, usage and implementation of the disclosed framework within existing communication networks and/or reliance as a supplemental or augmenting transfer-network can have benefits for businesses, service providers, individuals and entities.

In some embodiments, for example, with respect to a business or service provider, the disclosed systems and methods can enable risk transference from organizations to the framework by not directly storing individuals' private data, thereby reducing the risk and costs of data loss, storage, backup, compliance, and the like, or some combination thereof. In the event of a data breach, the disclosed framework can operate to reduce an organization's exposure to regulatory action, lawsuits, and reputational damage.

Furthermore, the disclosed framework can ensure that organizations have timely and accurate customer data that is authorized for use by their customers. The framework's operations can evidence the consolidation and/or transfer of responsibility for regulatory compliance (e.g., California, GDPR, and the like). Moreover, the framework can reduce fraud by identifying an individual's identity and personal data in real-time (e.g., at the time of request for access (e.g., read/write)), thereby providing advanced support and security for operational entities and providers, such as, but not limited to, supporting call centers, online self-service processing, administrative processes, and the like.

In some embodiments, in another non-limiting example, with regard to an individual or entity, the framework can provide individuals with novel computerized capabilities to control who has authorized access to their personal data and for how long, which in some embodiments, can be based on and/or corresponding to regulatory rights. Thus, the framework can render an individual's publicly known and/or stolen personal information to be less valuable to such bad actors, which can reduce the chances for identity theft and fraud, among other added security benefits for protecting individuals' data.

Thus, as provided for by the instant disclosure, the disclosed framework provides an E2E centralized service for individuals to manage and update their private data across multiple applications, services, platforms and/or portals associated with businesses and service providers. Indeed, operations and implementations of the framework can also impact how entities manage, host, protect and/or avail requesting parties to user data. For example, insurance companies can leverage the disclosed systems and methods to prevent fraudulent activity of their members.

As such, according to some embodiments, the disclosed framework operates by ensuring that access to data is always approved by the Data Owner in advance of granting access. In some embodiments, this can be in real-time or for pre-defined periods of access as configured by the Data Owner. According to some embodiments, for some business use cases, for example, extended access may be required to use the business's services. However, in some embodiments, it still may be up to the Data Owner to decide if they agree to the access up front and/or during such granted access.

The disclosed framework uses a distributed, secured, multi-key architecture to ensure data is always secure while the data is "at rest" and "in transit." According to some embodiments, the framework can encrypt data with a proprietary multi-key algorithm that cannot be decrypted without authorization from the Data Owner. This algorithm can also be leveraged by the Data owner to revoke access to use their data at any point and restrict it from authorized future use.

According to some embodiments, a method is disclosed that provides functionality and capabilities for a multi-key encryption platform that enables parties to audit control over access to their private, restricted or otherwise confidential data.

In general, in some embodiments, the invention features a method that includes receiving, by a device, a request for access to a user account of a Data Owner, the request originating from a Data Requestor, the user account comprising user data. The method further includes identifying, by the device, a Data Contract, the Data Contract comprising information related to a networked relationship between the Data Owner, Data Requestor and the device. The method further includes identifying, by the device, based on the Data Contract, a set of encryption keys, the set of encryption keys being part of a multi-key encryption scheme associated with the Data Contract, each encryption key in the set of encryption keys being respectively assigned to the Data Owner, Data Requestor and the device. The method further includes receiving, by the device, approval of the request. The method further includes performing the multi-key encryption scheme, by the device, by combining each encryption key based on the approval. The method further includes facilitating, by the device over a network, user account access to the Data Requestor based on the combination of each encryption key.

Implementations of the invention can include one or more of the following features:

The method can further include receiving a request for the creation of the user account of the Data Owner and creating the user account.

The method can further include verifying the identity of the Data Owner before creating the user account.

The request for access to a user account of a plurality of Data Owner can be included within a request originating from the Data Requestor of a bulk upload for access to a plurality of Data Owners' user accounts.

The method can further include receiving, by a device, a request by the Data Requestor of an Data Requester's account. The method can further include verifying the identity of the Data Requester. The method can further include, after verification of the identity of the Data Requester, creating the Data Requester's account.

The method can further include creating the Data Contract; and facilitating subscription to the Data Contract by the Data Owner.

The method can further include that, when the Data Requester requires the user data of the Data Owner to interact with a third party, a proxy gateway data flow allows the Data Requester to keep the user data of the Data Owner inaccessible from an internal system of the Data Requester.

The method can further include that, when the user data of the Data Owner is required to execute and/or is included in a query result set of a structured query language query by the Service Provider, performing the query against data sets containing reference to the user data of the Data Owner, while maintaining the user data of the Data Owner inaccessible from an internal system of the Data Requester.

In accordance with one or more embodiments, the present disclosure provides a non-transitory computer-readable storage medium for carrying out the above mentioned technical steps. The non-transitory computer-readable storage medium has tangibly stored thereon, or tangibly encoded thereon, computer readable instructions that when executed by a device, cause at least one processor to perform a method that provides functionality and capabilities for a multi-key encryption platform that enables parties to audit control over access to their private, restricted or otherwise confidential data.

In accordance with one or more embodiments, a system is provided that comprises one or more computing devices and/or apparatus configured to provide functionality in accordance with such embodiments. In accordance with one or more embodiments, functionality is embodied in steps of a method performed by at least one computing device and/or apparatus. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 1 is a block diagram of an example configuration within which the systems and methods disclosed herein could be implemented according to some embodiments of the present disclosure.

FIG. 3 illustrates an exemplary data flow according to some embodiments of the present disclosure.

DETAILED DESCRIPTION

Figure 2:
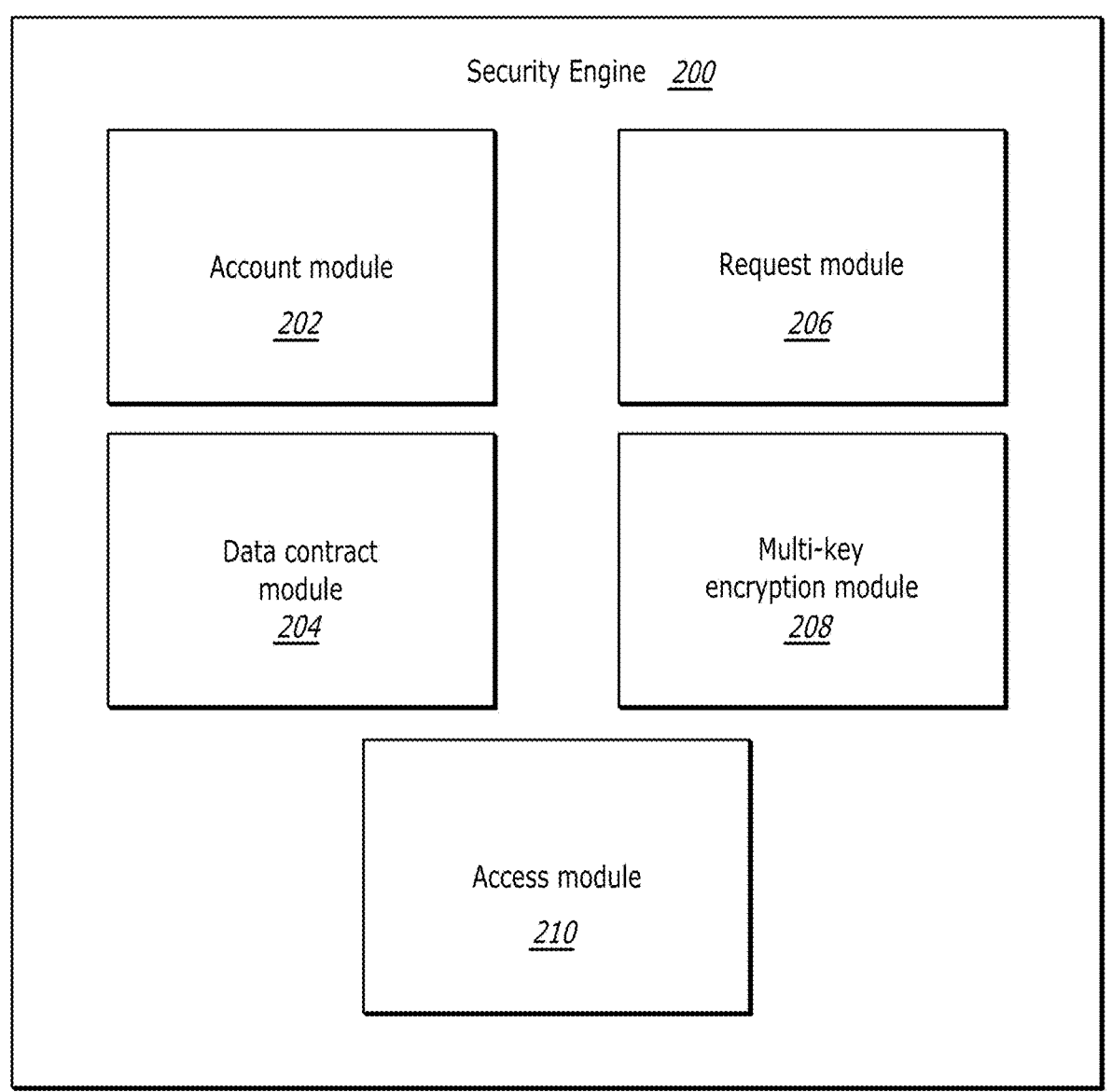
FIG. 2 is a block diagram illustrating components of an exemplary system according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. The disclosed (and claimed) subject matter is intended to cover a wide range of potential variations, such as a web-enabled client device or previously mentioned devices that may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

For purposes of this disclosure, the below Table (TABLE I) illustrates terminology that one of ordinary skill in the art would readily understand; however, for clarity of disclosure purposes, such terms have been defined so as to enable a more concise disclosure of the framework's configuration and operation.

TABLE I

| Term | Definition |
|------|------------|
| Access Term | The period of time that a "Data Contract" will be in force for a "Data Requestor's" access. |
| Account | A user identity created for an individual or entity on a service provided by and/or associated with the disclosed framework. Accounts can be required for each "Data Owner" or "Data Requestor" on the framework's service. |
| Data Contract | A virtual agreement between a "Data Owner" and one or more "Data Requestors" for the specific data and period of time that the "Data Owner" is allowing the "Data Requestors'" access. |
| Data Record | A "Data Contract" will have one or more pieces of data associated with it and governed within the context of said Data Contract. Each of these pieces of data are known as a "Data Record". |
| Data Owner | Individual or entity who owns the data being stored within the disclosed framework. The Data Owner has control over "who, what, where and when" can access the data. |
| Data | Individual or entity who is requesting access to a Data |

TABLE I-continued

| Term | Definition |
|------|------------|
| Requestor | Owner's data. Data Requestors are the consumers of the Data Owners' data. |
| Entity | A type of "Data Owner", typically associated with an organization or company. |
| Individual | A type of "Data Owner", typically associated with a specific individual human user. |
| Service Provider | A type of "Data Requestor" who is accessing data to provide a service to the "Data Owner". |

Figure 1:
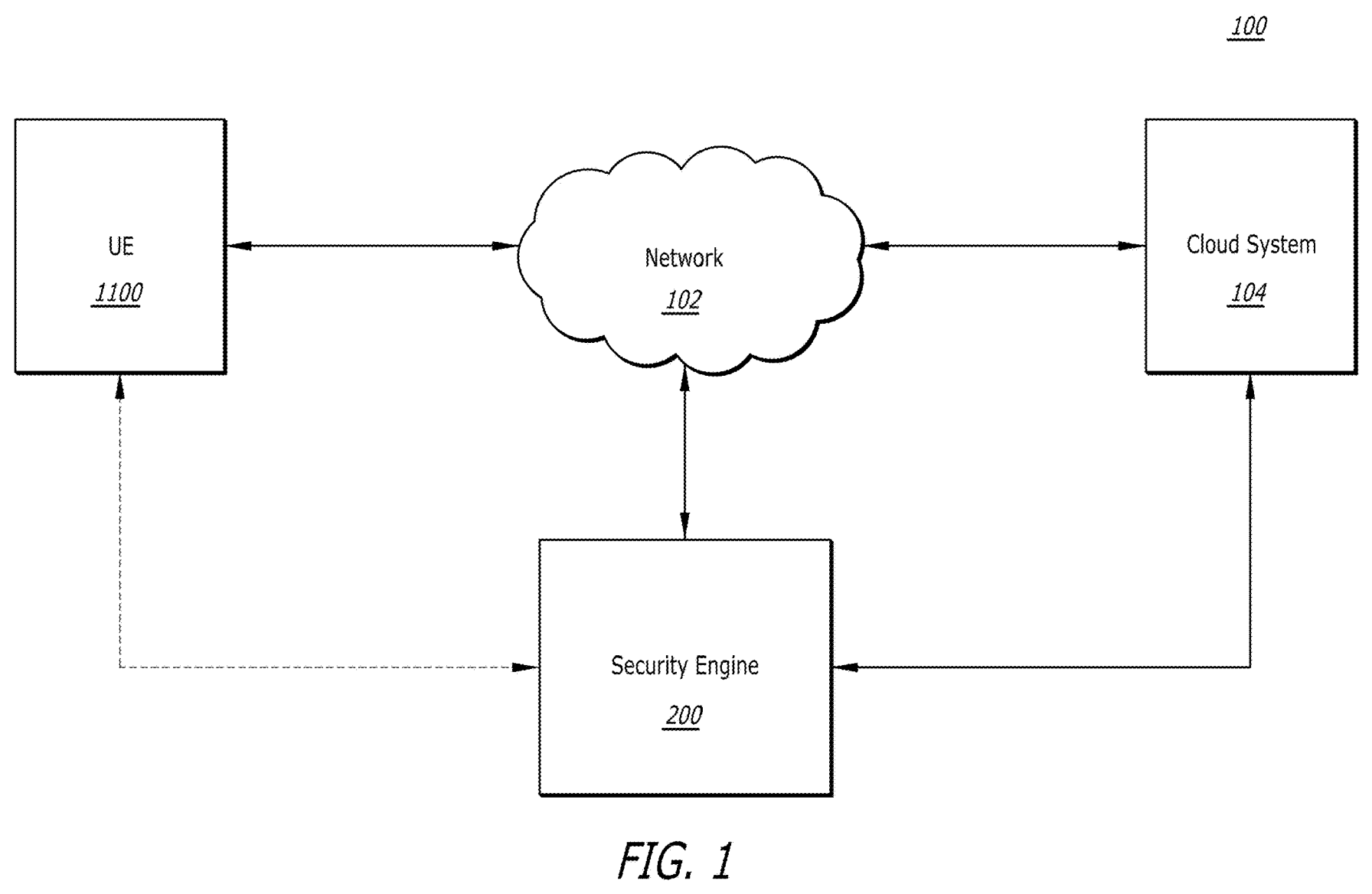

With reference to FIG. 1, system (or framework) 100 is depicted which includes UE 1100 (e.g., a client device), network 102, cloud system 104 and security engine 200. UE 1100 can be any type of device, such as, but not limited to, a mobile phone, tablet, laptop, personal computer, sensor, Internet of Things (IoT) device, autonomous machine, and any other device equipped with a cellular or wireless or wired transceiver. Further discussion of UE 1100 is provided below at least in reference to FIG. 11.

Network 102 can be any type of network, such as, but not limited to, a wireless network, cellular network, the Internet, and the like (as discussed above). As discussed herein, network 102 can facilitate connectivity of the components of system 100, as illustrated in FIG. 1.

Cloud system 104 can be any type of cloud operating platform and/or network based system upon which applications, operations, and/or other forms of network resources can be located. For example, system 104 can correspond to a service provider, network provider and/or medical provider from where services and/or applications can be accessed, sourced or executed from. In some embodiments, cloud system 104 can include a server(s) and/or a database of information which is accessible over network 102. In some embodiments, a database (not shown) of system 104 can store a dataset of data and metadata associated with local and/or network information related to a user(s) of UE 1100, user(s) and the UE 1100, and the services and applications provided by cloud system 104 and/or security engine 200.

Security engine 200, as discussed below in more detail, includes components that enable and provide multi-key encryption capabilities and functionality that enables a Data Owner (e.g., a party, user, plurality of users, entity, and/or business, for example) to audit control over access to their private, restricted or otherwise confidential data by a Data Requestor (e.g., a party, user, plurality of users, entity, and/or business or service provider, for example). As discussed in more detail below at least in reference to FIGS. 3-10, engine 200 provides computerized functionality for validating that the request for, access to and/or usage of private or restricted information is legitimate and approved by the Data Owner, whereby embodiments exist, as discussed herein, approval can be required, provided and/or requested in real-time (e.g., near-real time and/or substantially simultaneous with the request), and/or or via pre-approved access for a defined period. Embodiments of such functionality and the novel platform that provide such advanced security are discussed infra.

According to some embodiments, security engine 200 can be a special purpose machine or processor and could be hosted by a device on network 102, within cloud system 104 and/or on UE 1100. In some embodiments, engine 200 can be hosted by a peripheral device connected to UE 1100 (e.g., a smart watch connected to a Data Owner's smart phone, for example).

According to some embodiments, security engine 200 can function as an application provided by cloud system 104. In some embodiments, engine 200 can function as an application installed on UE 1100. In some embodiments, such application can be a web-based application accessed by UE 1100 over network 102 from cloud system 104 (e.g., as indicated by the connection between network 102 and engine 200, and/or the dashed line between UE 1100 and engine 200 in FIG. 1). In some embodiments, engine 200 can be configured and/or installed as an augmenting script, program or application (e.g., a plug-in or extension) to another application or program provided by cloud system 104 and/or executing on UE 1100.

As illustrated in FIG. 2, according to some embodiments, security engine 200 includes account module 202, data contract module 204, request module 206, multi-key encryption module 208, and access module 210. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Turning now to FIG. 3, Process 300 is disclosed which details non-limiting example embodiments for a computerized framework that provides advanced privacy and security solutions to computer networks and the data housed and transferred therein. As discussed herein, the disclosed framework provides multi-key encryption over a distributed, secure architecture that operates by protecting and ensuring the authorized use of an individual or entity's data. The disclosed framework provides a centralized service for management of user and/or entity data across multiple businesses and service providers.

According to some embodiments, Steps 302-304 of Process 300 can be performed by account module 202 of security engine 200; Steps 306-308 can be performed by data contract module 204; Step 310 can be performed by request module 206; Step 312 can be performed by multi-key encryption module 208; and Step 314 can be performed by access module 210.

Of note, for purposes of this disclosure, reference to "IDentiKey" in the accompanying figures (e.g., FIGS. 4-10, discussed below) is in reference to the disclosed framework and engine 200's operation. IDentiKey is referenced as a type of proprietary platform/algorithm, however the name should not be construed as limiting.

Process 300 begins with Step 302 where engine 200 creates a user account for a Data Owner. According to some embodiments, an example of the processing of Step 302 by engine 200 is illustrated in FIGS. 4A-4B.

Figure 4A:
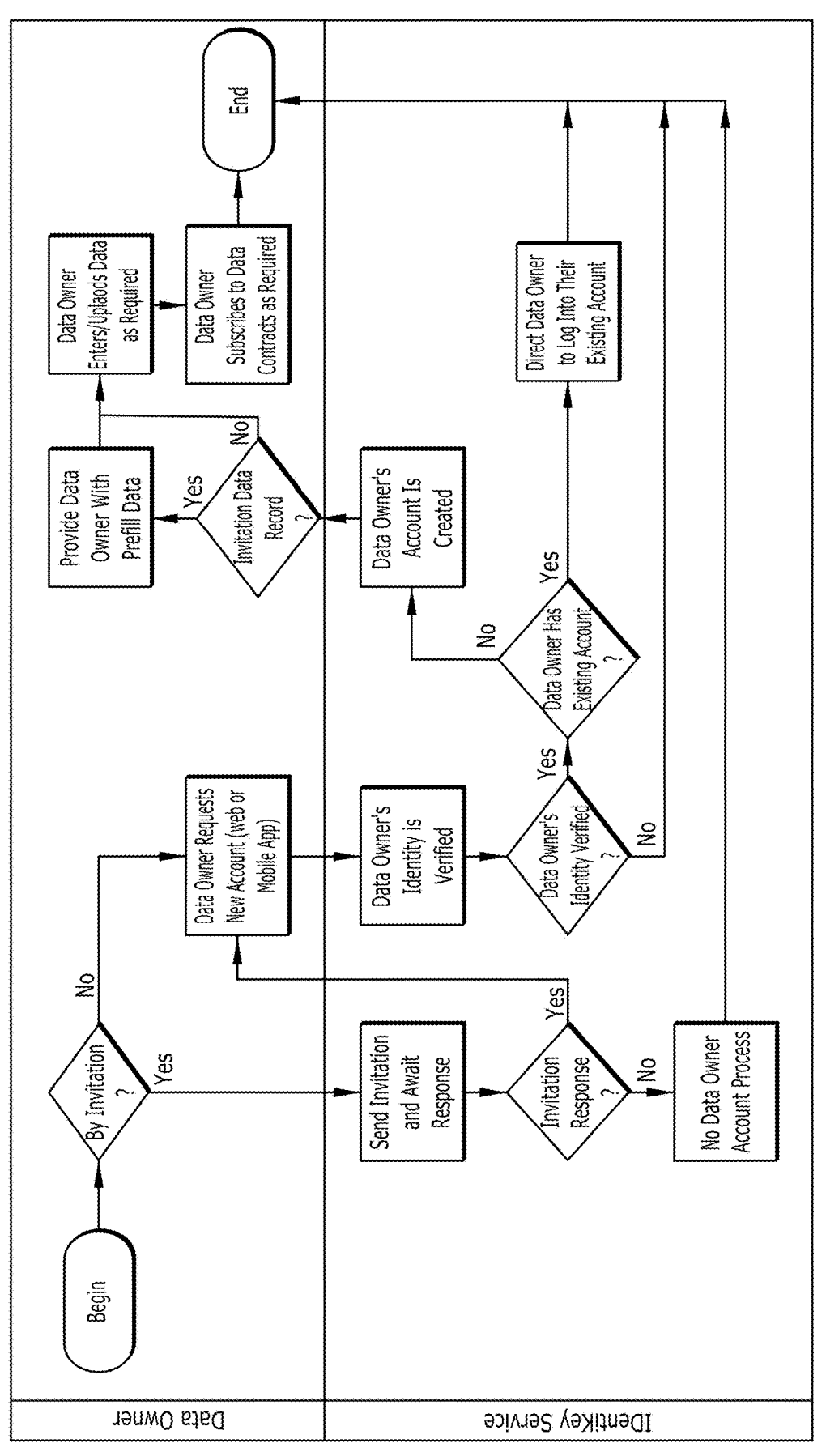
FIG. 4A illustrates an exemplary data flow according to some embodiments of the present disclosure.
Figure 4B:
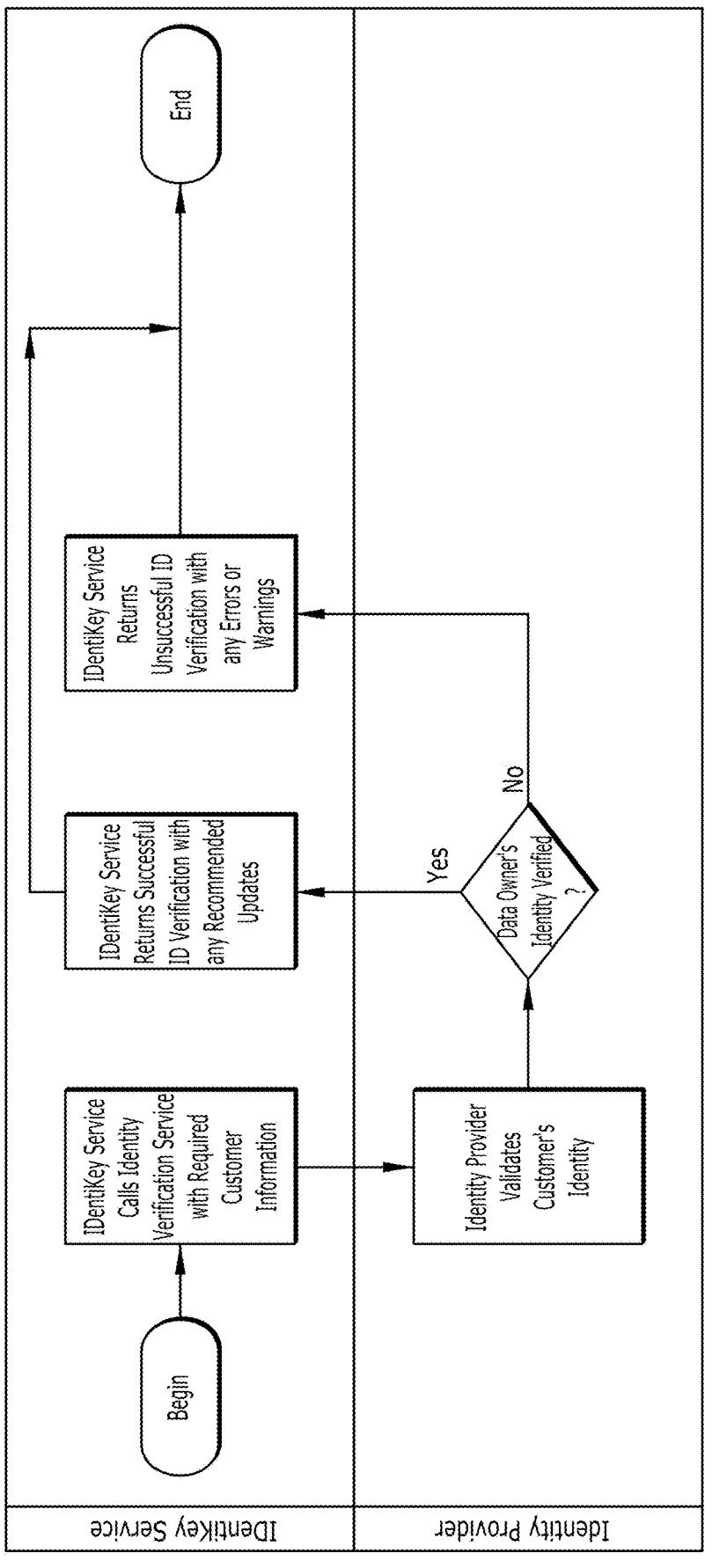
FIG. 4B illustrates an exemplary data flow according to some embodiments of the present disclosure.

According to some embodiments, Step 302, which involves a "Data Owner Account Creation" data flow as illustrated in FIG. 4A, involves any individual or entity requesting a new user account from a website associated with the framework or via an application associated with the framework. In some embodiments, this is the standard user/framework account where the individual or entity is a Data Owner. Once the account is created, the Data Owner may enter any data, including, but not limited to, private, personally identifiable, confidential, public, or any other information they wish to control the access to by other parties. Such data can be associated with third party platforms.

By way of a non-limiting example, the stored user data can include, but is not limited to, information associated with a user's profile, user interests, user behavioral information, user patterns, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the account can be any type of information related to a user, content, a device, an application, a service provider, a content provider, whether known or to be known, without departing from the scope of the present disclosure According to some embodiments, Step 304, which involves an "ID Verification" data flow as illustrated in FIG. 4B, involves engine 200's processing for verifying that an entity is a legitimate entity and not an attempt to create a false or fraudulent entity account within the platform.

Once the Data Owner has created their account and entered any data, they can then choose to subscribe to any Data Contracts as they see fit to define how and when they share data with other parties to the Data Contract, as discussed below.

Process 300 then proceeds to Step 304 where engine 200 can create (or allocate) the user account for the Data Owner by a Data Requestor. According to some embodiments, an example of the processing of Step 304 by engine 200 is illustrated in FIGS. 5A-5C.

Figure 5A:
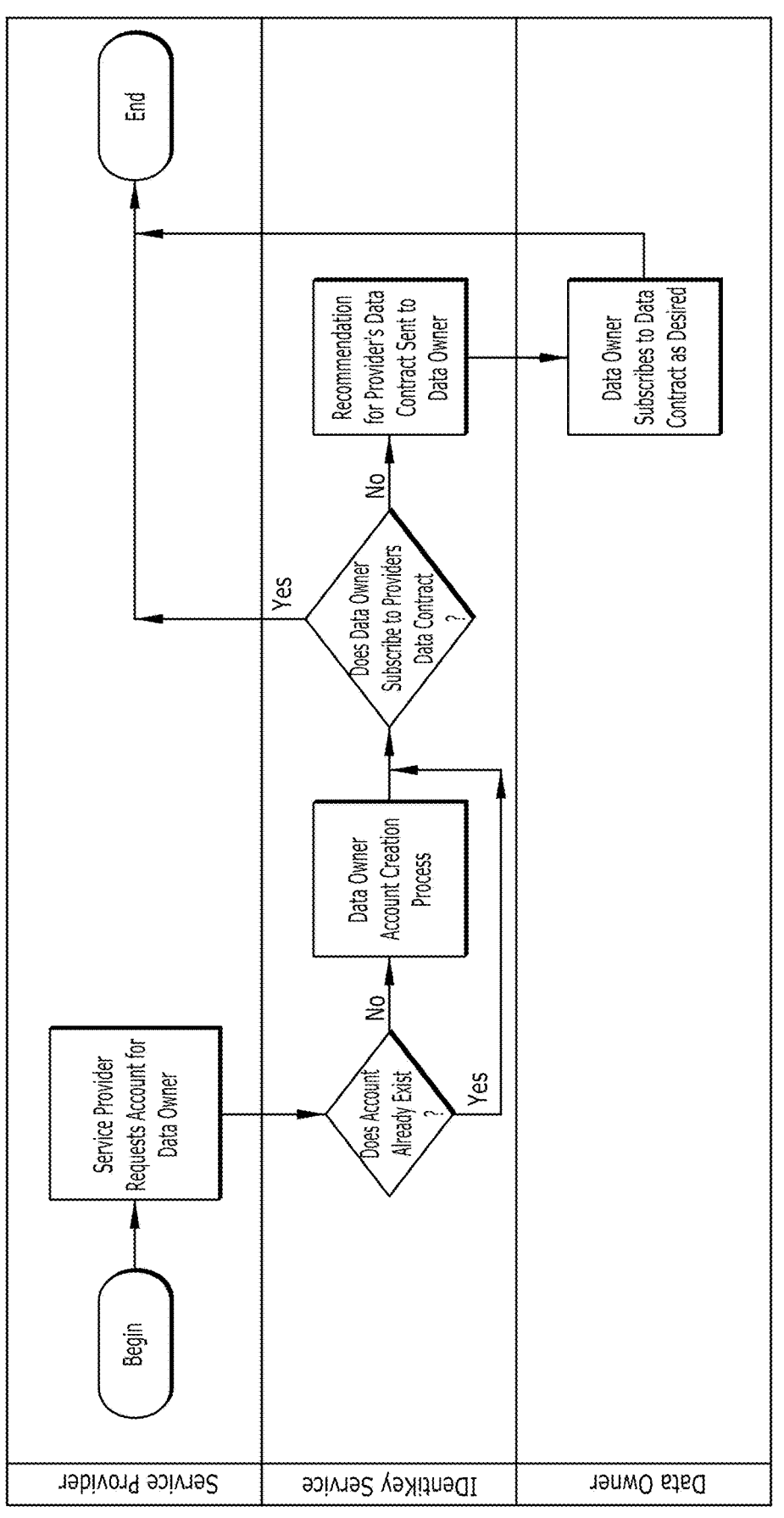
FIG. 5A illustrates an exemplary data flow according to some embodiments of the present disclosure.

According to some embodiments, Step 304, which involves a "Service Provider Requests an Account on Behalf of a Data Owner" data flow as illustrated in FIG. 5A, involves engine 200's processing for a service provider to request the creation of a framework account on behalf of the service provider's current or potential customer. For example if user Bob is a customer of service provider X, then service provider X can request and have thereby created an account according to this established relationship (e.g., Bob is a subscriber to an Insurance Company, for example). According to some embodiments, Step 304 can be processed for a single user/customer or as a mass consumer onboarding procedure so as to enable usage of the disclosed framework's security capabilities.

Figure 5B:
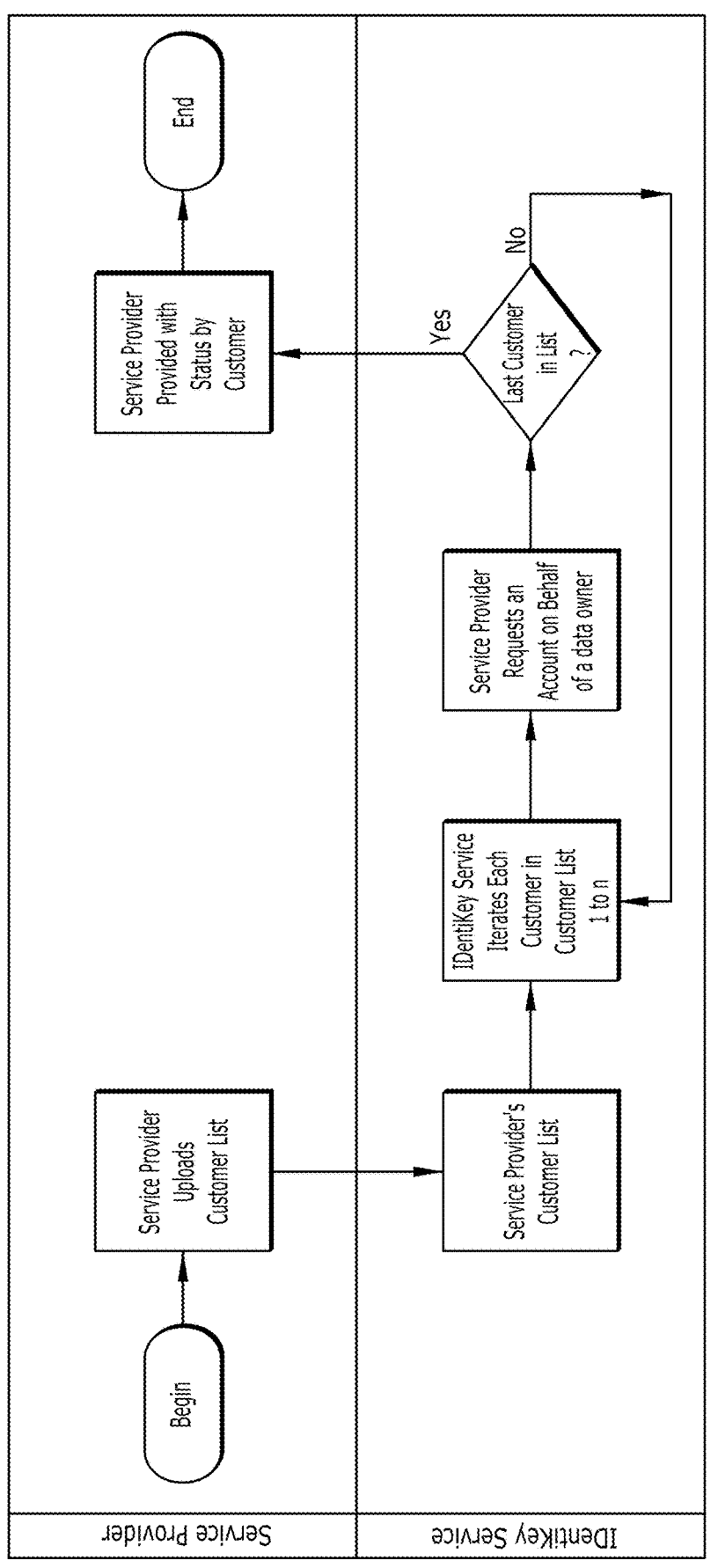
FIG. 5B illustrates an exemplary data flow according to some embodiments of the present disclosure.

According to some embodiments, Step 304, which involves a "Service Provider Requests Bulk Upload of Existing Customers" data flow as illustrated in FIG. 5B, involves engine 200's processing for a service provides to request the creation of a framework account on behalf of the service provider's current or potential customers in bulk. This would be used for mass customer onboarding for a service provider to bring their customers onto the platform when the service provider is a new to the platform, or is moving a new customer block onto the platform.

Figure 5C:
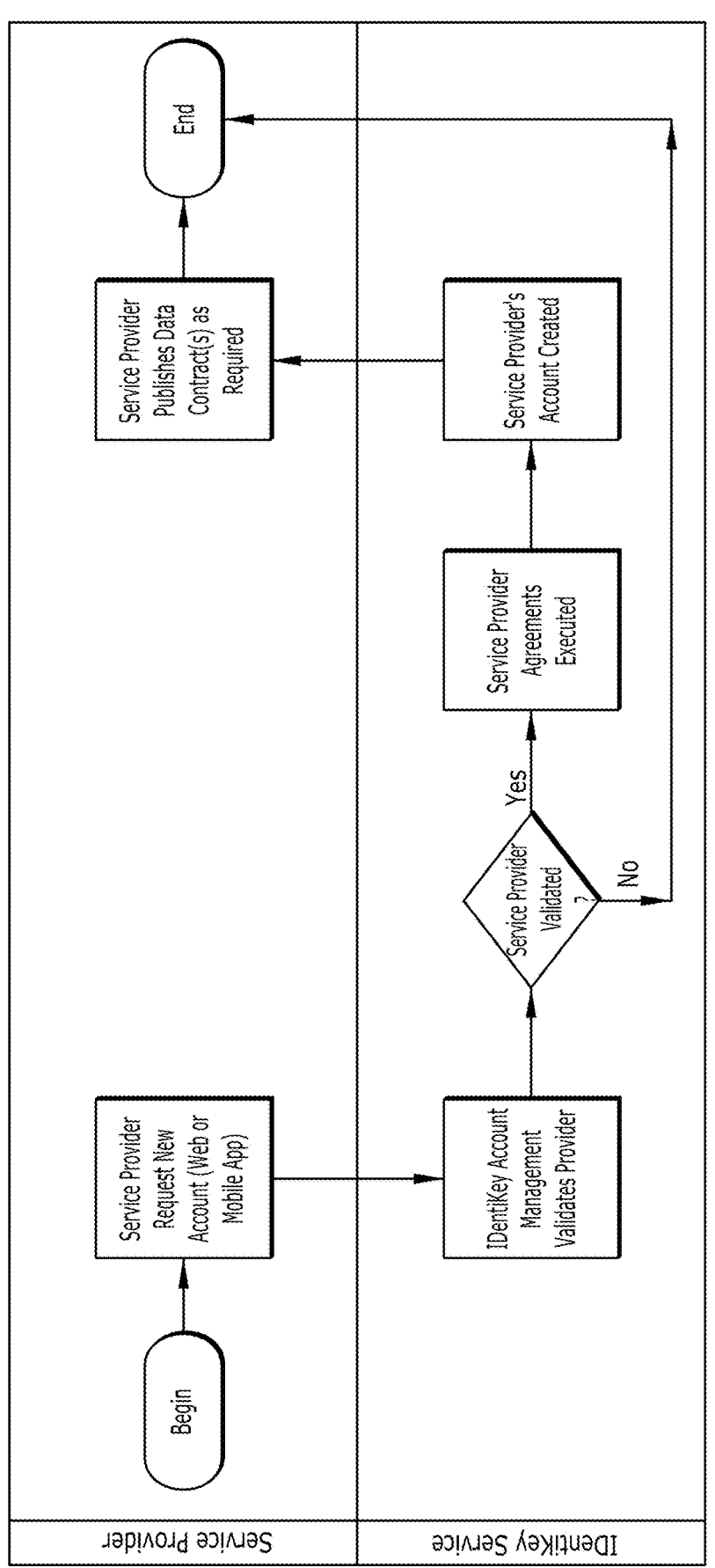
FIG. 5C illustrates an exemplary data flow according to some embodiments of the present disclosure.

According to some embodiments, Step 304, which involves a "Service Provider Account Creation" data flow as illustrated in FIG. 5C, involves engine 200's processing for verifying that a Service Provider is a legitimate entity, with an ongoing concern, that requires access to a Data Owner's data to provide a product or service for a Data Owner. The process includes validation and terms of use to contractually obligate the Service Provider to abide by the platform service agreements.

In Step 306, engine 200 creates a Data Contract associated with the Data Requestor. According to some embodiments, an example of the processing of Step 306 by engine 200 is illustrated in FIG. 6.

Figure 6:
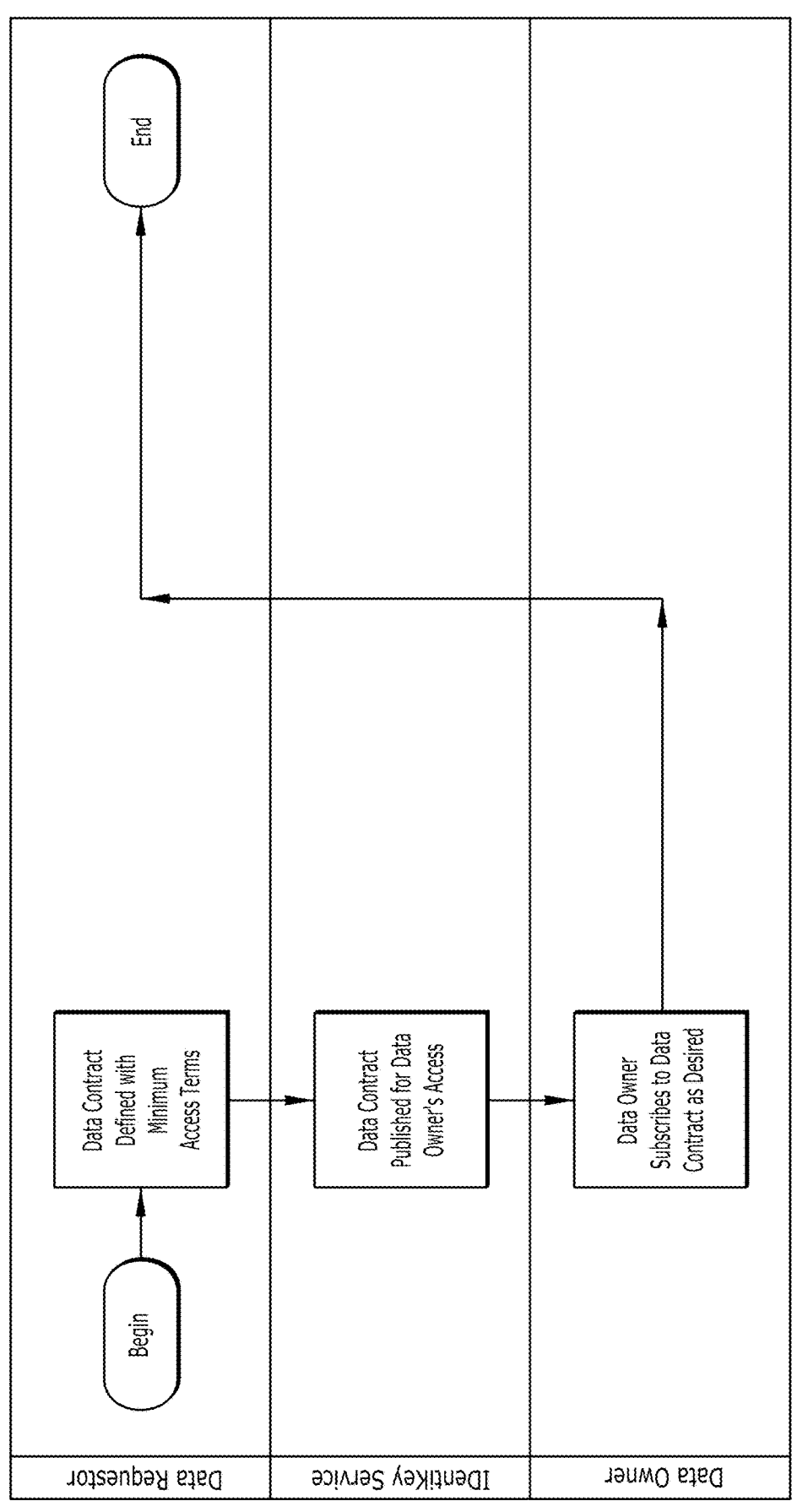
FIG. 6 illustrates an exemplary data flow according to some embodiments of the present disclosure.

According to some embodiments, Step 306, which involves a "Data Contract Creation" data flow as illustrated in FIG. 6, involves the Data Requestor creating a Data Contract. According to some embodiments, the Data Contract can specify, but is not limited to, the type of data the Data Requestor requires for the purposes of the contract, as well as any minimum access terms. For example, Data Requestor can be an insurance provider, the Data owner being a policy holder of that insurance, and the Data Contract can specify a required minimum set of personal information related to the Data Owner (for at least the life of an insurance policy).

According to some embodiments, the Data Contract can be configured as an electronic data structure, such as, but not limited to, an electronic document, entry onto a blockchain, an entry into a database, a smart contract, and the like, or some other form of electronic document that can govern how information within an account and/or according to a service agreement is managed or controlled.

According to some embodiments, once the Data Contract is created, engine 200 can publish the Data Contract or information related thereto to a network resource location for any potential customer (Data Owner) to subscribe to by agreeing to the terms of the contract.

According to some embodiments, the minimum terms for access (or subscription) to the Data Contract could be NULL, meaning that the Data Owner must approve every time data is accessed, or OPEN, meaning that the Data Requestor can access the data at any time under the Data Contract. In some embodiments, a minimum term for access can be anytime between zero and a predetermined number (e.g., infinity, for example). In some embodiments, by setting the minimum access terms of the Data Contract a service provider or Data Requestor can ensure that their operations are not unduly impacted by the need to get authorization to access data, while ensuring that the Data Owner is always aware of when and how their data is being used.

Process 300 then proceeds to Step 308, where engine 200 can facilitate the Data Owner subscribing to the Data Contract (that was published in Step 306). According to some embodiments, an example of the processing of Step 308 by engine 200 is illustrated in FIG. 7.

Figure 7:
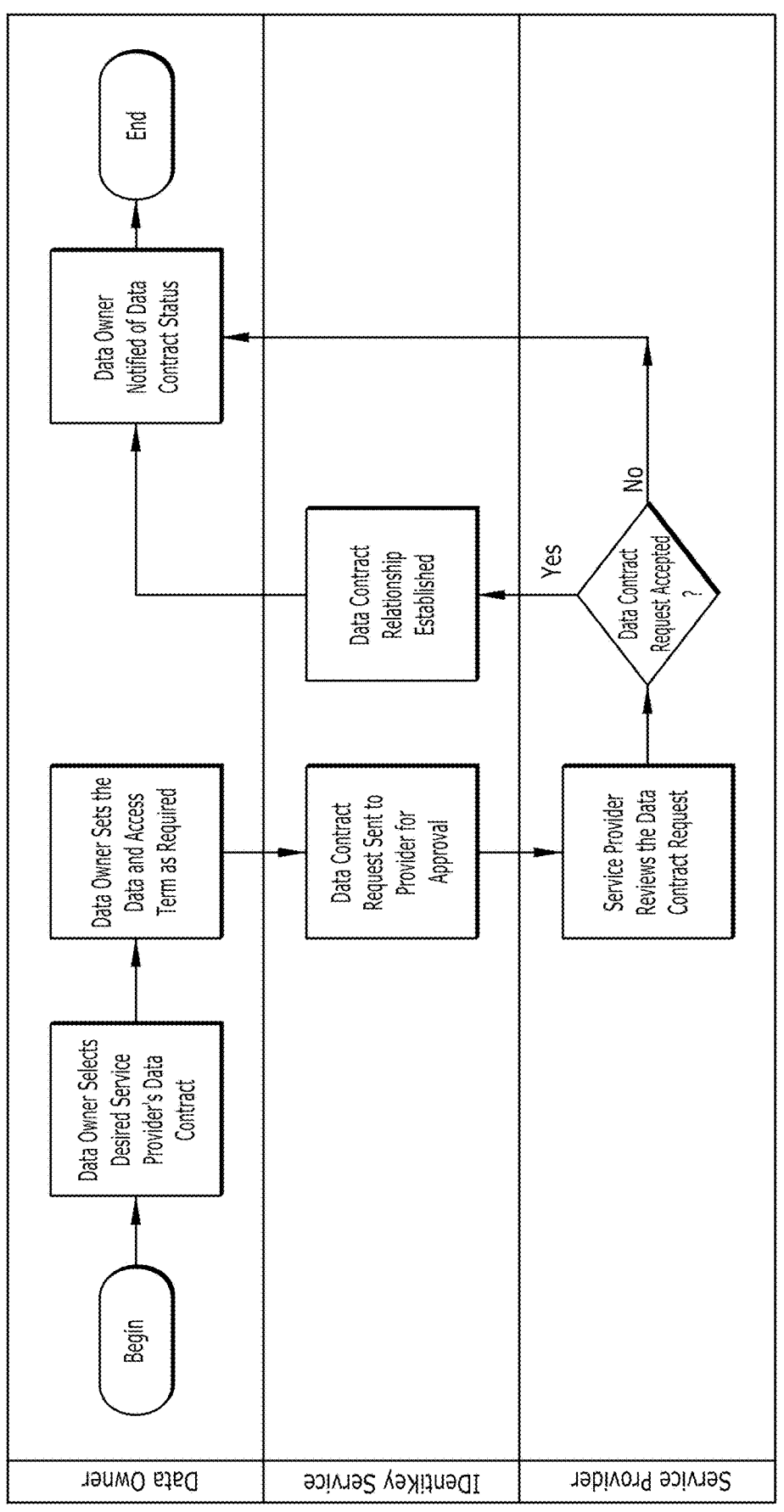
FIG. 7 illustrates an exemplary data flow according to some embodiments of the present disclosure.

According to some embodiments, Step 306, which involves a "Subscribing to a Data Contract" data flow as illustrated in FIG. 7, involves a Data Owner subscribing to a Data Contract that has been published by a service provider. According to some embodiments, the Data Owner can be a new or existing customer of the service provider (e.g., Data Requestor), allowing for the marketing to and onboarding of new customers for the service provider. In some embodiments, the subscription of Step 308 also provides for the service provider (e.g., Data Requestor) to choose whether they wish to accept the Data Owner as a subscriber to their Data Contract based on their own criteria or business rules.

According to some embodiments, upon a Data Owner subscribing to a Data Contract, multi-level encryption keys can be generated, assigned, determined or otherwise identified and provided to each party of the Data Contract, as discussed below. Thus, upon approval of an access request, the encrypted data of the Data Owner's user account can be access and read by the approved/authorized party (e.g., Data Requestor).

As such, at this point in processing of Process 300 (inclusive of Steps 302-308, supra), engine 200 has created accounts for a Data Owner and Data Requestor, created and published a Data Contract for the Data Requestor, and facilitated (e.g., enabled) subscription by the Data Owner to the Data Contract. Steps 310-312, infra, provide embodiments where engine 200 enables the authorized access to data of the account of the Data Owner.

Continuing with Process 300, Step 310 involves engine 200 receiving a request from a Data Requestor to access information stored in the user account of the Data Owner. According to some embodiments, the request can be based on or associated with an event that can include, but is not limited to, activity by the Data Owner (requesting access to a Data Requestor hosted network resource, an electronic transaction, being at a particular location, and the like, or some combination thereof), activity by the Data Requestor (e.g., an ad sale, user data hosting by a third party, and the like), a request from a third party, the confirmation of a policy extension, and the like, or some combination thereof.

According to some embodiments, engine 200 can analyze the request to identify information related to, but not limited to, an identity of the Data Owner, which data within the user account of the Data Owner is being requested, which type of access (e.g., read/write), an identity of the Data Requestor, whether a Data Contract exists, and the like, or some combination thereof.

According to some embodiments, the computational analysis performed in Step 310 can be based on any type of known or to be known computational analysis algorithm, technology, mechanism or classifier, such as, but not limited to, neural networks (e.g., artificial neural network analysis (ANN), convolutional neural network (CNN) analysis, and the like), computer vision, cluster analysis, data mining, Bayesian network analysis, Hidden Markov models, logical model and/or tree analysis, and the like.

In response to the request of Step 312, engine 200 can perform the multi-key encryption processing of Step 312, whereby in Step 314 read/write access to the user account information of the Data Owner can (e.g., may or may not) be facilitated (e.g., granted or denied).

Figure 8:
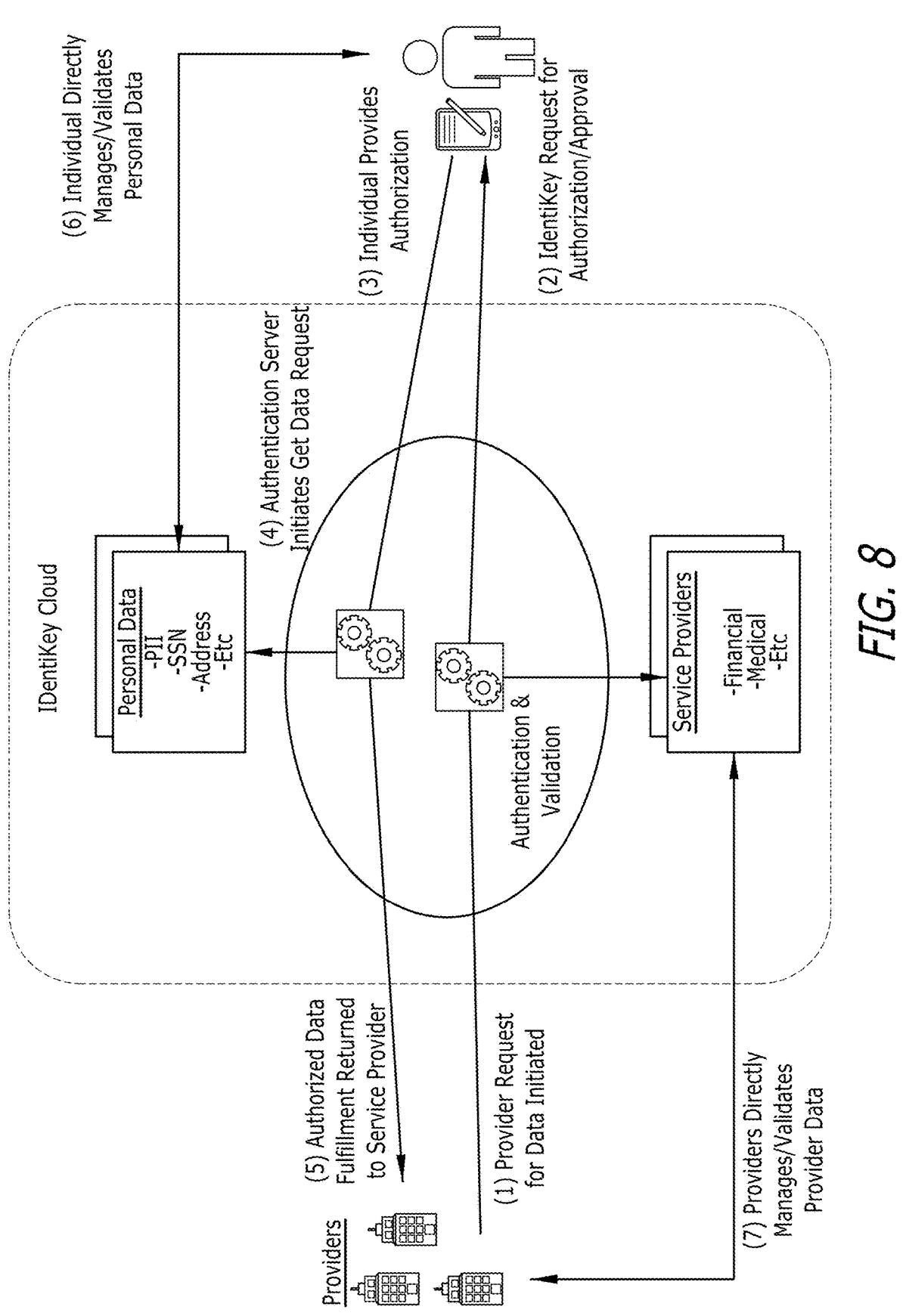
FIG. 8 illustrates an exemplary data flow according to some embodiments of the present disclosure.

By way of a non-limiting example of the processing of Steps 310-312, engine 200 can perform the processing depicted in FIG. 8. Such processing ensures that the Data Owner maintains audit control of which person, device, service, application or entity gains access to their data (as well as write access). For example, if such data is not enabled by the Data Owner to be modified, the account information accessed can be annotated, tagged or otherwise secured via any type of known or to be known privacy enhancing technology (PET) or security enhancing technology (SET). As such, according to some embodiments as illustrated in FIG. 8, engine 200 provides a zero trust, distributed, multi-key architecture where no single entity can gain access to data other than the Data Owner unless they are a verified entity. Indeed, in some embodiments, the Application Program Interfaces (APIs), administrators or other users of the framework cannot gain access to any Data Owner data without prior approval, which is enabled via the disclosed multi, split key architecture.

By way of another non-limiting example of the processing of Steps 310-312, engine 200 can perform the processing depicted in FIGS. 9A-9D.

Figure 9A:
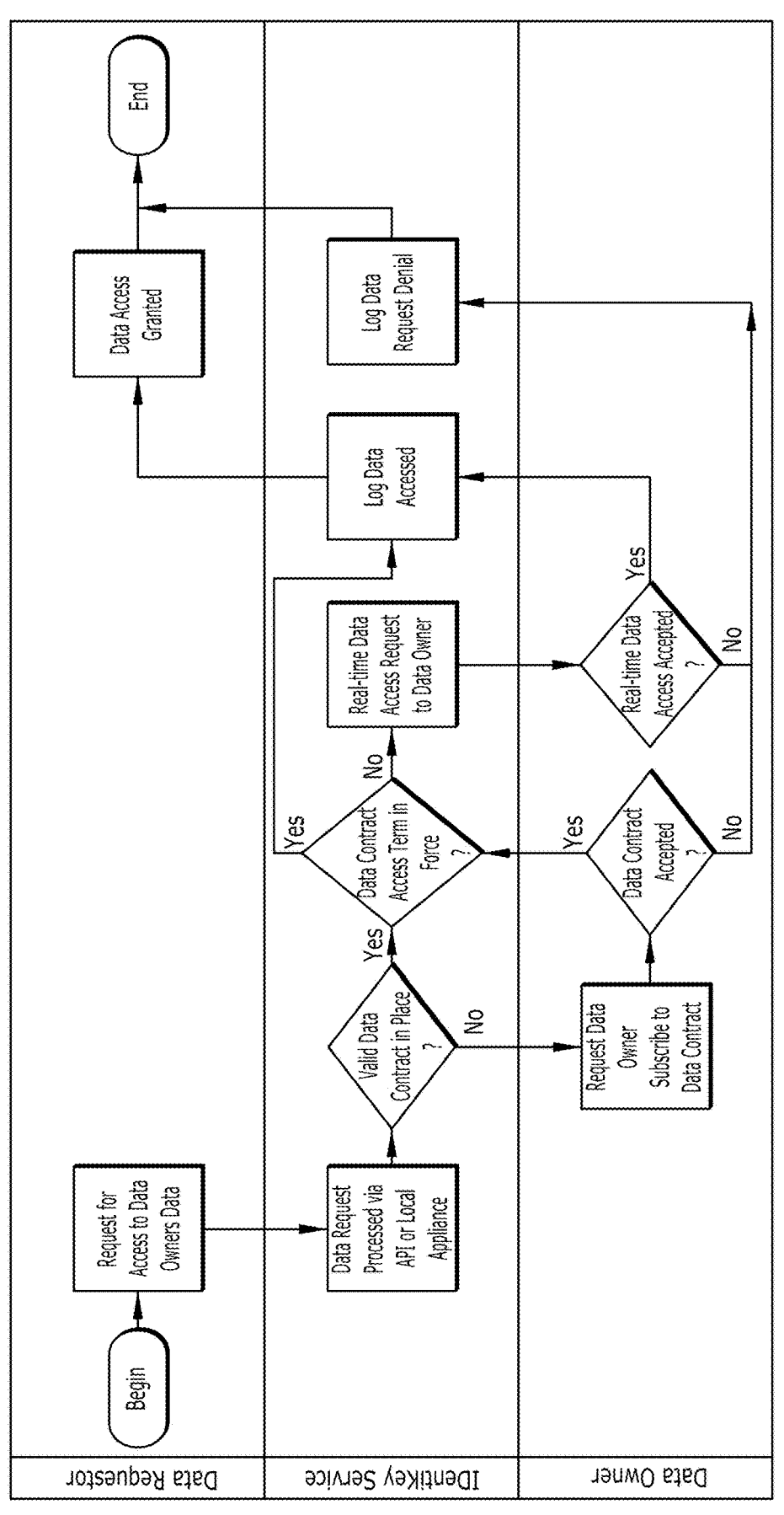
FIG. 9A illustrates an exemplary data flow according to some embodiments of the present disclosure.

According to some embodiments, FIG. 9A provides an executable "Requesting Data Access" data flow that involves the processing of a request from a Data Requestor to access a Data Owner's data. For example, this could represent a bank requesting access to a potential customer's data to underwrite a new loan. In that scenario the bank (Data Requestor) can request the customers data. Engine 200 can check for a valid Data Contract between the bank and customer that specifies the Data Owners relationship with the bank to provide such requested access. If a Data Contract did not exist or was not valid, the request to establish a Data Contract would begin (e.g., proceed to Step 306). If the Data Contract is in place, engine 200 can notify the customer (Data Owner) that the bank is accessing their information under the terms of the Data Contract.

In some embodiments, it should be noted that the above example accounts for an embodiment where a Data Owner may want to approve each time a Data Requestor wants to access their data. This could correspond to infrequent transactions, new customer onboarding activities, or a sales transaction with an online merchant, for example, among other embodiments.

According to some embodiments, unique encryption keys can be held by all Data Contract parties and engine 200. That is, a unique encryption key can be held by the Data Owner, Data Requestor and engine 200. In some embodiments, each encryption key may be specific to each party and a portion of a whole to be combined for enabling access to the requested data. This ensures that the Data Owner's data cannot be decrypted and accessed unless all parties to the Data Contract (e.g., Data Owner, Data Requestor and engine 200) agree/consent with the data access. According to some embodiments, all requests to access data are logged for auditing and monitoring by engine 200 as a backstop to address and thwart fraudulent activity and/or types of spoofing that could impair a Data Owner's determinations of access to their data.

Figure 9B:
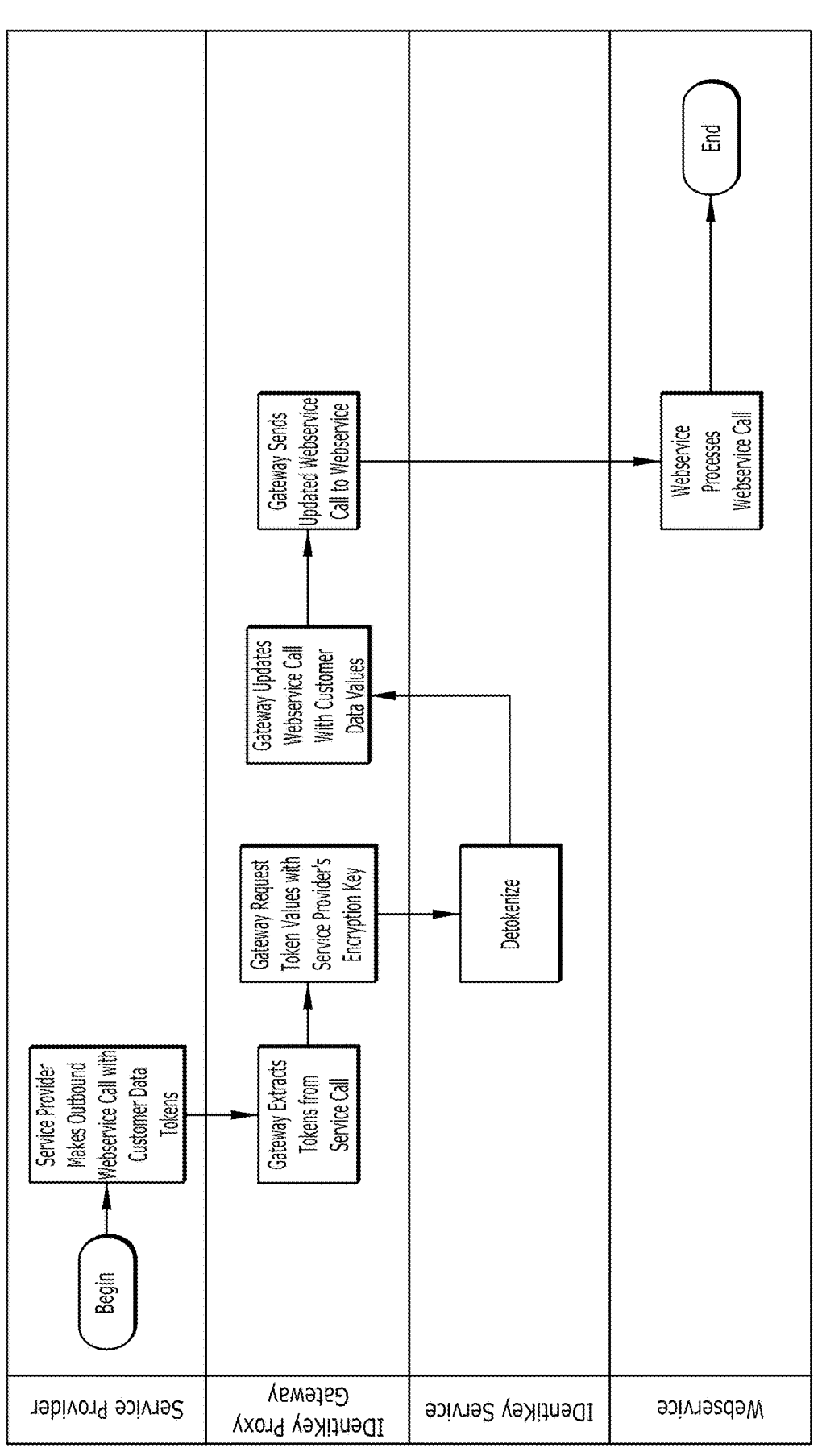
FIG. 9B illustrates an exemplary data flow according to some embodiments of the present disclosure.
Figure 9C:
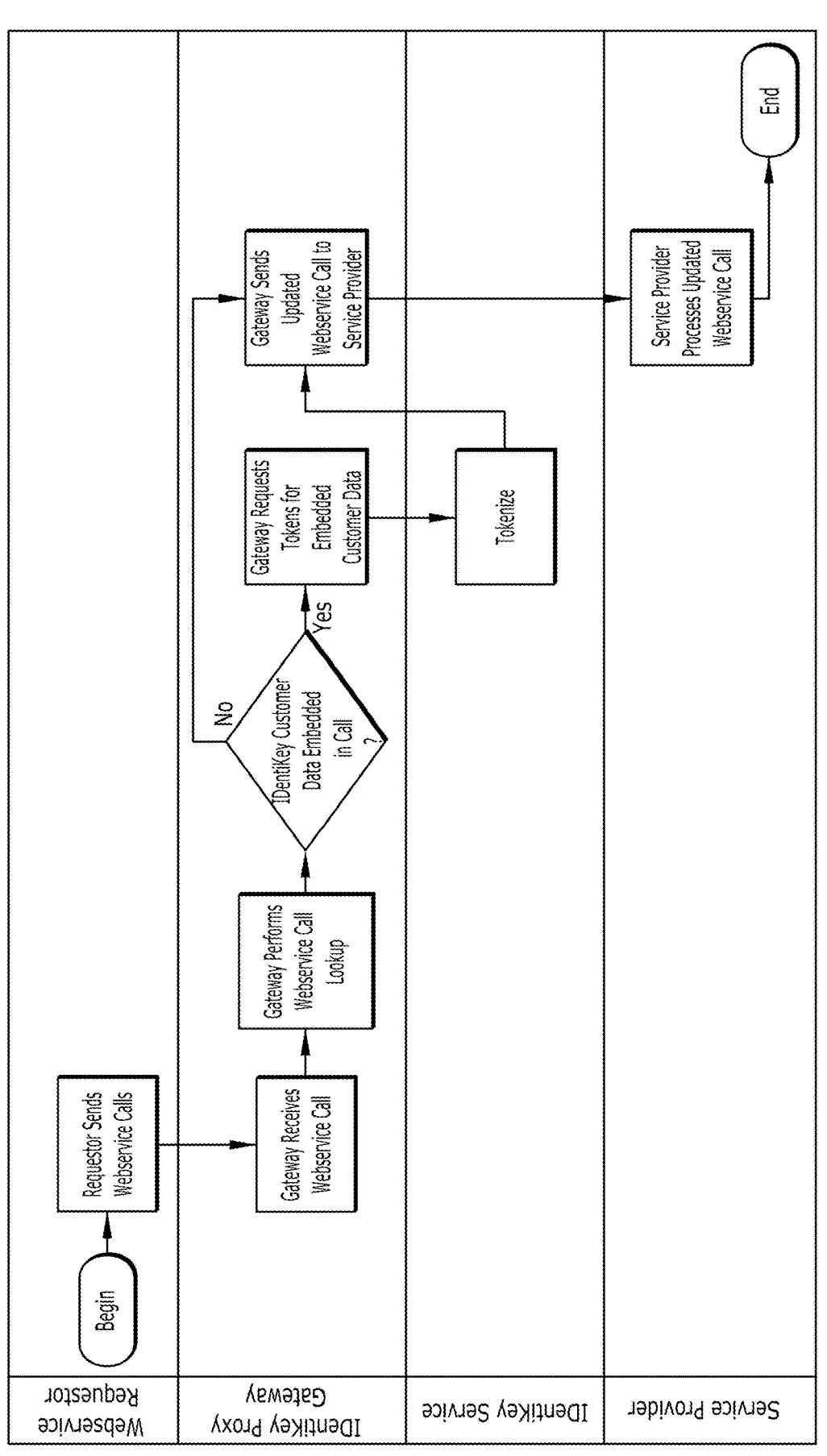
FIG. 9C illustrates an exemplary data flow according to some embodiments of the present disclosure.

According to some embodiments, Step 310, which involves a "Proxy Gateway" data flow as illustrated in FIG. 9B (outbound call) and FIG. 9C (inbound call), involves engine 200's processing for the platform to intercept and interpret a Service Provider's defined in and outbound web service calls where a Data Owner's data is required to interact with third parties to deliver the Service Provider's product or service for the Data Owner. The process allows the Service Provider to keep the Data Owner's data inaccessible from the Service Provider's own internal systems and processes to reduce the risk of inadvertent access or the need to maintain the Data Owner's data outside of the platform.

Figure 9D:
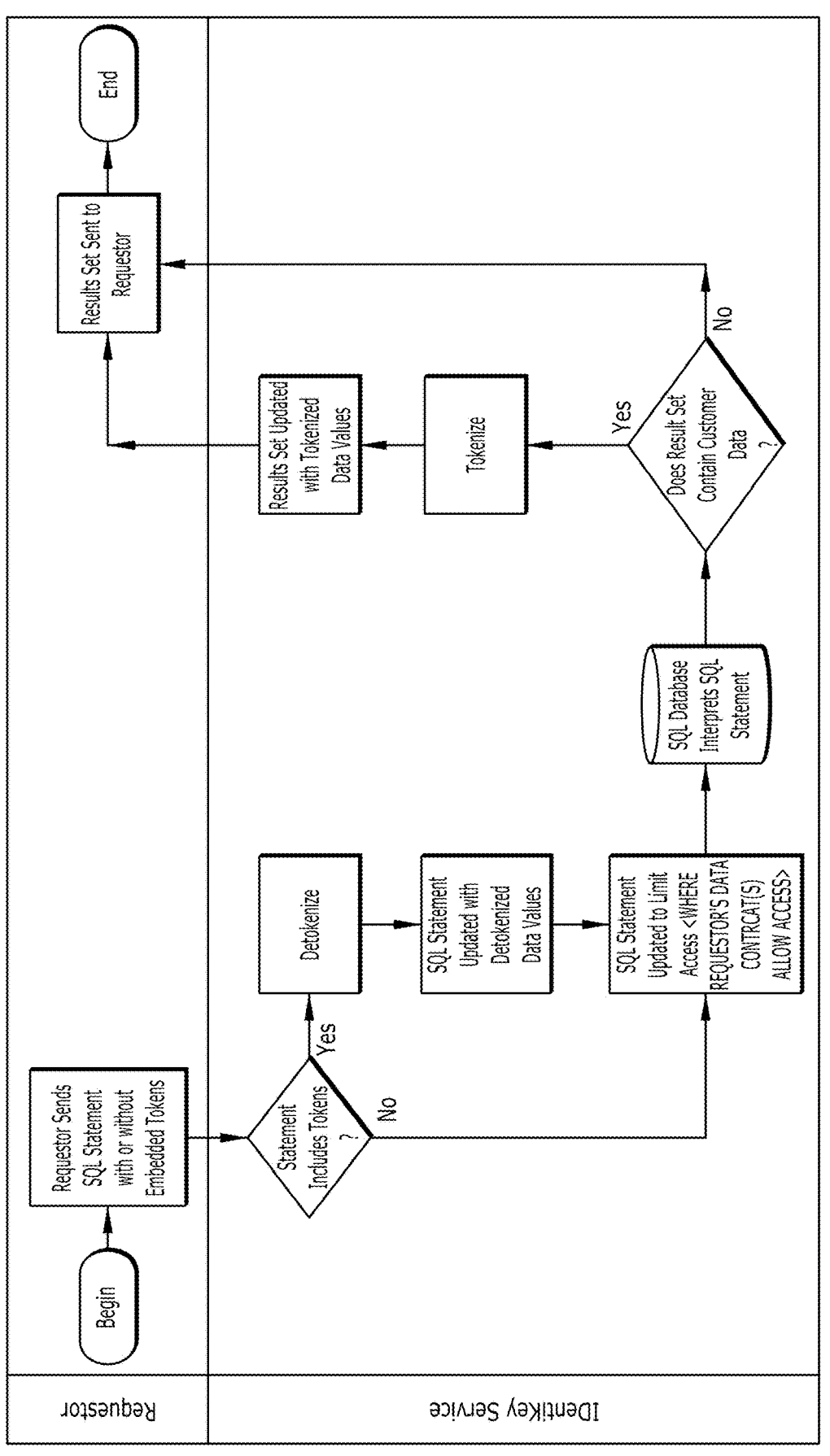
FIG. 9D illustrates an exemplary data flow according to some embodiments of the present disclosure.

According to some embodiments, Step 310, which involves a "SQL Interpreter" data flow as illustrated in FIG. 9D, involves engine 200's processing for the platform to intercept and interpret a Service Provider's structured query language (SQL) queries where a Data Owner's data is required to either execute and/or may be included in the query's result set. The process allows the Service Provider to perform existing or ad-hoc queries, and to perform analytics against data sets containing reference to a Data Owner's data, but while ensuring the data is inaccessible from the Service Provider's own internal systems and processes to reduce the risk of inadvertent access or the need to maintain the Data Owner's data outside of the platform.

Figure 10:
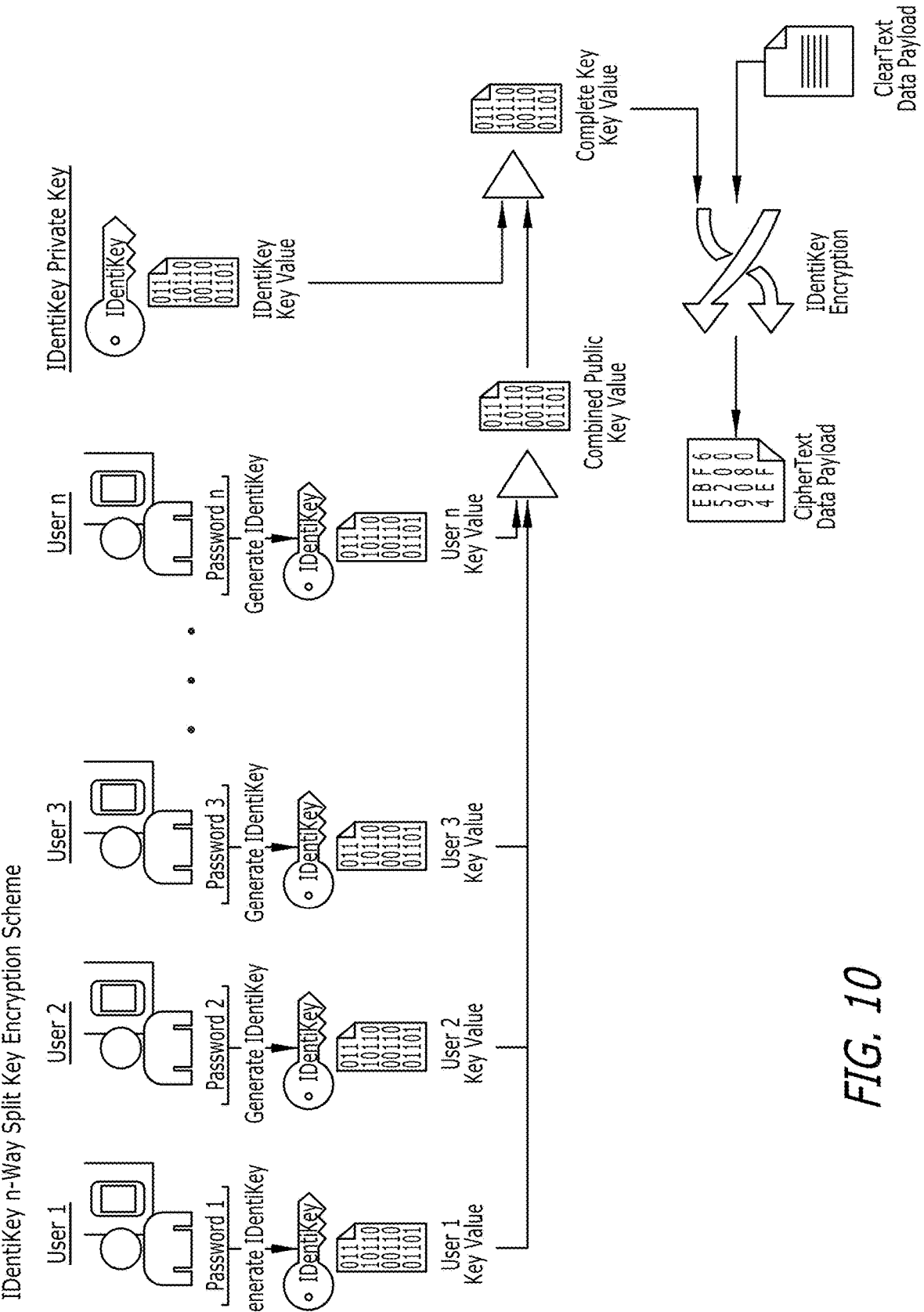
FIG. 10 illustrates a non-limiting example of an embodiment of the disclosed systems and methods according to some embodiments of the present disclosure.

Turning to FIG. 10, a non-limiting example of a multi-(or split-) key encryption scheme implemented by engine 200 is illustrated. The disclosed scheme relies on multiple, physically and logically distributed sub-keys to encrypt and decrypt data (a Data Record).

It should be understood that while the disclosure herein focuses on a two-way Data Contract between an individual consumer and service provider, it should not be construed as limiting, as the disclosed framework is configured for (as one of skill in the art would understand) a N-way Data Contract, allowing for "N" (e.g., unlimited) participants in a Data Contract. As such, in some embodiments, the number of participants may not limited by the architecture of the disclosed framework, but may only, in limited circumstances, be bounded by the available computing power or network characteristics (e.g., bandwidth).

As illustrated in FIG. 10, each member of the Data Contract (the "Public Users" 1-N) has a piece of the encryption key (e.g., a sub-key). These sub-keys can be combined to create the full encryption key that is then applied to the data payload or Data Contract (e.g., thereby unlocking the user account). In some embodiments, a Public User can be an individual consumer or a business or service provider. In some embodiments, engine 200 can contribute a sub-key that will be incorporated into the full encryption key. This enables engine 200 to prevent decryption of a Data Contract if needed for any legitimated government ordered reason (e.g., national security).

An example of a Split-Key Encryption Algorithm implemented by engine 200 is provided below in TABLE II. It should be noted that the terms "private" and "public" are used for matter of linguistic convenience only (e.g., they do not have the traditional meanings implied by public key asymmetric cryptography). Further, the below example leverages an Advanced Encryption Standard (AES) as a representative encryption algorithm, and it should not be construed as limiting, as other types of known or to be known encryption protocols can be utilized as part of the multi-key encryption, without departing from the scope of the instant disclosure.

TABLE II

| User Hash Values |
| --- |
| Let $P_X$ be the cleartext representation of the Password for a given user X<br>Let $K_X$ be the key value of $P_X$ for a given user X using a given key generation function<br>Such that $K_X$ = GenerateKey($P_X$) for a given key generation function |
| Combined Hash Values |
| Let $K_I$ be the "private" framework key value<br>Let $K_P$ be the "combined" key value of all "Public" user key values<br>Such that $K_P$ = CombineKeys($H_1$, $H_2$, $H_3$, $H_4$, . . . , $H_N$) for any N number<br>of user has values, where keys are combined using a proprietary algorigm<br>Let $K_E$ be the full Encryption hash key<br>Such that $K_E$ = CombineKeys($K_P$, $K_I$) |
| Encyrption/decryption Scheme |
| $\text{TEXT}_{CIPHER}$ = IdentiKeyEncrypt($\text{TEXT}_{CLEAR}$, $K_E$) for a proprietary IdentiKey encryption algorithm<br>Cleartext will be encrypted with the full encryption key/hash $K_E$<br>$\text{TEXT}_{CLEAR}$ = IdentiKeyDecrypt($\text{TEXT}_{CIPHER}$, $K_E$) for a proprietary IdentiKey decryption algorithm<br>Ciphertext will be decrypted with the full encryption key/hash $K_E$ |

Figure 11:
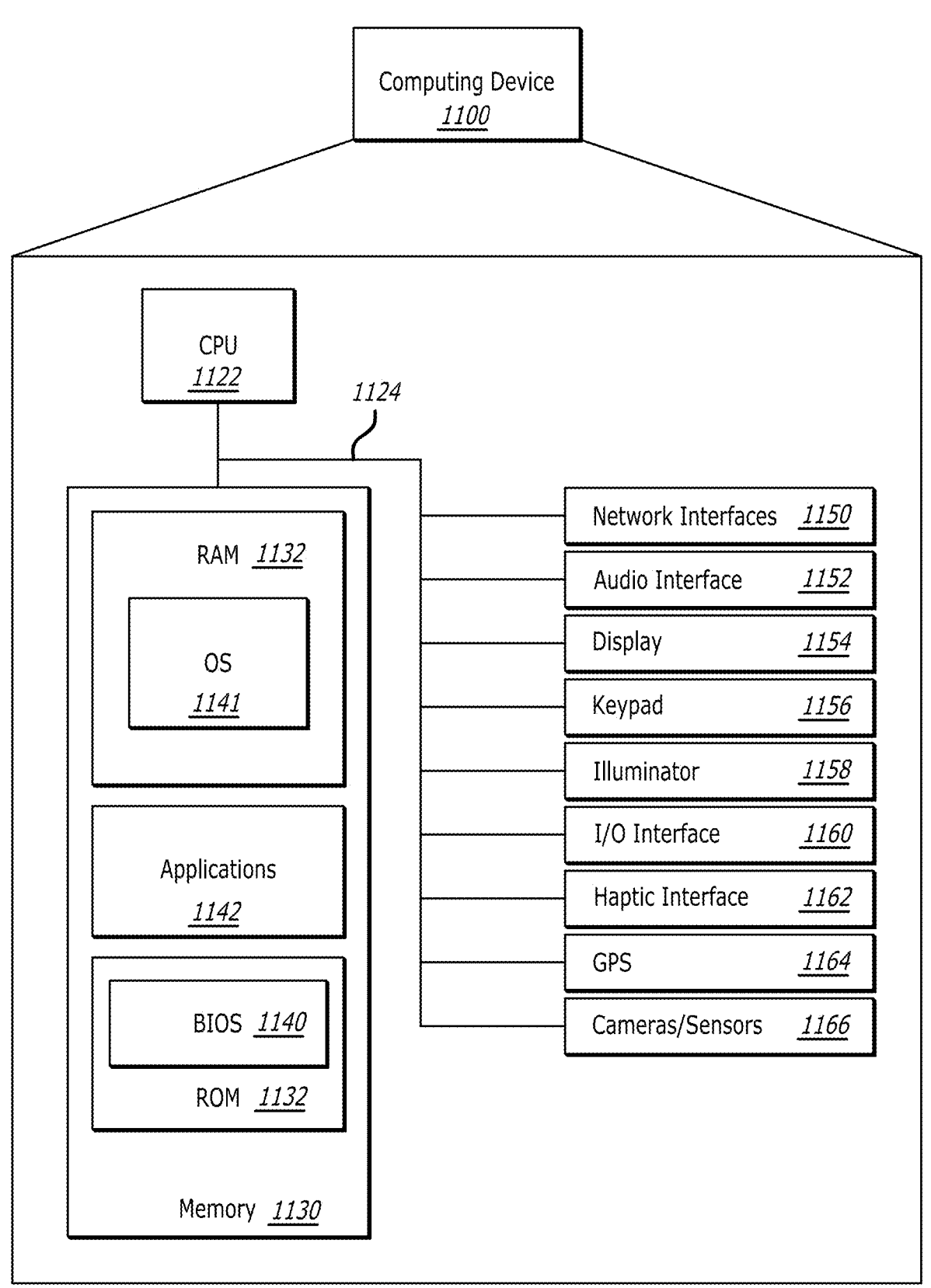
FIG. 11 is a block diagram illustrating a computing device showing an example of a device used in various embodiments of the present disclosure.

FIG. 11 is a block diagram illustrating a computing device 1100 (e.g., UE 1100, as discussed above) showing an example of a client device or server device used in the various embodiments of the disclosure.

The computing device 1100 may include more or fewer components than those shown in FIG. 11, depending on the deployment or usage of the device 1100. For example, a server computing device, such as a rack-mounted server, may not include audio interfaces 1152, displays 1154, key-pads 1156, illuminators 1158, haptic interfaces 1162, GPS receivers 1164, or cameras/sensors 1166. Some devices may include additional components not shown, such as graphics processing unit (GPU) devices, cryptographic co-processors, AI accelerators, or other peripheral devices.

As shown in FIG. 11, the device 1100 includes a central processing unit (CPU) 1122 in communication with a mass memory 1130 via a bus 1124. The computing device 1100 also includes one or more network interfaces 1150, an audio interface 1152, a display 1154, a keypad 1156, an illuminator 1158, an input/output interface 1160, a haptic interface 1162, an optional GPS receiver 1164 (and/or an interchangeable or additional GNSS receiver) and a camera(s) or other optical, thermal, or electromagnetic sensors 1166. Device 1100 can include one camera/sensor 1166 or a plurality of cameras/sensors 1166. The positioning of the camera(s)/sensor(s) 1166 on the device 1100 can change per device 1100 model, per device 1100 capabilities, and the like, or some combination thereof.

In some embodiments, the CPU 1122 may comprise a general-purpose CPU. The CPU 1122 may comprise a single-core or multiple-core CPU. The CPU 1122 may comprise a system-on-a-chip (SoC) or a similar embedded system. In some embodiments, a GPU may be used in place of, or in combination with, a CPU 1122. Mass memory 1130 may comprise a dynamic random-access memory (DRAM) device, a static random-access memory device (SRAM), or a Flash (e.g., NAND Flash) memory device. In some embodiments, mass memory 1130 may comprise a combination of such memory types. In one embodiment, the bus 1124 may comprise a Peripheral Component Interconnect Express (PCIe) bus. In some embodiments, the bus 1124 may comprise multiple busses instead of a single bus.

Mass memory 1130 illustrates another example of computer storage media for the storage of information such as computer-readable instructions, data structures, program modules, or other data. Mass memory 1130 stores a basic input/output system ("BIOS") 1140 for controlling the low-level operation of the computing device 1100. The mass memory also stores an operating system 1141 for controlling the operation of the computing device 1100.

Applications 1142 may include computer-executable instructions which, when executed by the computing device 1100, perform any of the methods (or portions of the methods) described previously in the description of the preceding Figures. In some embodiments, the software or programs implementing the method embodiments can be read from a hard disk drive (not illustrated) and temporarily stored in RAM 1132 by CPU 1122. CPU 1122 may then read the software or data from RAM 1132, process them, and store them to RAM 1132 again.

The computing device 1100 may optionally communicate with a base station (not shown) or directly with another computing device. Network interface 1150 is sometimes known as a transceiver, transceiving device, or network interface card (NIC).

The audio interface 1152 produces and receives audio signals such as the sound of a human voice. For example, the audio interface 1152 may be coupled to a speaker and microphone (not shown) to enable telecommunication with others or generate an audio acknowledgment for some action. Display 1154 may be a liquid crystal display (LCD), gas plasma, light-emitting diode (LED), or any other type of display used with a computing device. Display 1154 may also include a touch-sensitive screen arranged to receive input from an object such as a stylus or a digit from a human hand.

Keypad 1156 may comprise any input device arranged to receive input from a user. Illuminator 1158 may provide a status indication or provide light.

The computing device 1100 also comprises an input/output interface 1160 for communicating with external devices, using communication technologies, such as USB, infrared, Bluetooth™, or the like. The haptic interface 1162 provides tactile feedback to a user of the client device.

The optional GPS transceiver 1164 can determine the physical coordinates of the computing device 1100 on the surface of the Earth, which typically outputs a location as latitude and longitude values. GPS transceiver 1164 can also employ other geo-positioning mechanisms, including, but not limited to, triangulation, assisted GPS (AGPS), E-OTD, CI, SAI, ETA, BSS, or the like, to further determine the physical location of the computing device 1100 on the surface of the Earth. In one embodiment, however, the computing device 1100 may communicate through other components, provide other information that may be employed to determine a physical location of the device, including, for example, a MAC address, IP address, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "Data Owner", "Data Requestor", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. More-over, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:

(a) receiving, by a device, a request for access to a user account of a Data Owner, the request originating from a Data Requestor, the user account comprising user data;

(b) identifying, by the device, a Data Contract, the Data Contract comprising information related to a networked relationship between the Data Owner, Data Requestor and the device, wherein the information related to a networked relationship between the Data Owner, Data Requestor and the device comprises (i) information regarding the ability for the Data Owner to specify a term or duration for which the Data Contract is valid or requires explicit approval at each use, (ii) information regarding one or more individuals, organizations and/or companies that are parties or participants in and to the Data Contract that allows for the Data Contract to be an N-way Data Contract, (iii) information regarding the Data Requestor describing authorized and acceptable use of the Data Contract, (iv) information regarding the ability for the Data Requestor and/or Data Owner to specify nature of data that will be housed under the Data Contact via a Data Record, (v) information regarding ability to notify one or more of the parties or participants in and to the Data Contract when the information within the Data Contract is updated, (vi) information regarding ability to perform event logging and to create an audit trail for when the data is accessed and used, and by whom and for what purpose, and (vii) information regarding ability to retrieve the data in one or more manners, wherein the one or more manners comprise at least one manner selected from the group consisting of (A) retrieval of the data in actual form, (B) retrieval of the data in masked and/or obfuscated for, and (C) retrieval of the data in tokenized representation form;

(c) identifying, by the device, based on the Data Contract, a set of encryption keys, the set of encryption keys being part of a multi-key encryption scheme associated with the Data Contract, each encryption key in the set of encryption keys being respectively assigned to the Data Owner, Data Requestor and the device, wherein (i) the Data Owner has the ability to rescind access to the data under the Data Contract by withdrawing the encryption key assigned to the Data Owner, and (ii) the encryption key assigned to the device can prevent access to the data when circumstances are determined by the device for the prevention of access to the data;

(d) receiving, by the device, approval of the request;

(e) performing the multi-key encryption scheme, by the device, by combining each encryption key based on the approval; and (f) facilitating, by the device over a network, user account access to the Data Requestor based on the combination of each encryption key.

2. The method of claim 1 further comprising:

(a) receiving a request for the creation of the user account of the Data Owner; and (b) creating the user account.

3. The method of claim 2 further comprising verifying the identity of the Data Owner before creating the user account.

4. The method of claim 1, wherein the request for access to a user account of a plurality of Data Owner is included within a request originating from the Data Requestor of a bulk upload for access to a plurality of Data Owners' user accounts.

5. The method of claim 1 further comprising:

(a) receiving, by a device, a request by the Data Requestor of an Data Requester's account;

(b) verifying the identity of the Data Requester; and (c) after verification of the identity of the Data Requester, creating the Data Requester's account.

6. The method of claim 1 further comprising:

(a) creating the Data Contract; and (b) facilitating subscription to the Data Contract by the Data Owner.

7. The method of claim 1 further comprising that, when the Data Requester requires the user data of the Data Owner to interact with a third party, a proxy gateway data flow allows the Data Requester to keep the user data of the Data Owner inaccessible from an internal system of the Data Requester.

8. The method of claim 1 further comprising that, when the user data of the Data Owner is required to execute and/or is included in a query result set of a structured query language query by the Service Provider, performing the query against data sets containing reference to the user data of the Data Owner, while maintaining the user data of the Data Owner inaccessible from an internal system of the Data Requester.

9. A non-transitory computer-readable storage medium tangibly encoded with computer-executable instructions, that when executed by a device, perform a method comprising steps of:

(a) receiving, by the device, a request for access to a user account of a Data Owner, the request originating from a Data Requestor, the user account comprising user data;

(b) identifying, by the device, a Data Contract, the Data Contract comprising information related to a networked relationship between the Data Owner, Data Requestor and the device, wherein the information related to a networked relationship between the Data Owner, Data Requestor and the device comprises (i) information regarding the ability for the Data Owner to specify a term or duration for which the Data Contract is valid or requires explicit approval at each use, (ii) information regarding one or more individuals, organizations and/or companies that are parties or participants in and to the Data Contract that allows for the Data Contract to be an N-way Data Contract, (iii) information regarding the Data Requestor describing authorized and acceptable use of the Data Contract, (iv) information regarding the ability for the Data Requestor and/or Data Owner to specify nature of data that will be housed under the Data Contact via a Data Record, (v) information regarding ability to notify one or more of the parties or participants in and to the Data Contract when the information within the Data Contract is updated, (vi) information regarding ability to perform event logging and to create an audit trail for when the data is accessed and used, and by whom and for what purpose, and (vii) information regarding ability to retrieve the data in one or more manners, wherein the one or more manners comprise at least one manner selected from the group consisting of (A) retrieval of the data in actual form, (B) retrieval of the data in masked and/or obfuscated for, and (C) retrieval of the data in tokenized representation form;

(c) identifying, by the device, based on the Data Contract, a set of encryption keys, the set of encryption keys being part of a multi-key encryption scheme associated with the Data Contract, each encryption key in the set of encryption keys being respectively assigned to the Data Owner, Data Requestor and the device, wherein (i) the Data Owner has the ability to rescind access to the data under the Data Contract by withdrawing the encryption key assigned to the Data Owner, and (ii) the encryption key assigned to the device can prevent access to the data when circumstances are determined by the device for the prevention of access to the data;

(d) receiving, by the device, approval of the request;

(e) performing the multi-key encryption scheme, by the device, by combining each encryption key based on the approval; and (f) facilitating, by the device over a network, user account access to the Data Requestor based on the combination of each encryption key.

10. The non-transitory computer-readable storage medium of claim 9, wherein the non-transitory computer-readable storage medium tangibly is encoded with computer-executable instructions, that when executed by a device, perform a method further comprising:

(a) receiving a request for the creation of the user account of the Data Owner; and (b) creating the user account.

11. The non-transitory computer-readable storage medium of claim 10, wherein the non-transitory computer-readable storage medium tangibly is encoded with computer-executable instructions, that when executed by a device, perform a method further comprising verifying the identity of the Data Owner before creating the user account.

12. The non-transitory computer-readable storage medium of claim 9, wherein the request for access to a user account of a plurality of Data Owner is included within a request originating from the Data Requestor of a bulk upload for access to a plurality of Data Owners' user accounts.

13. The non-transitory computer-readable storage medium of claim 9, wherein the non-transitory computer-readable storage medium tangibly is encoded with computer-executable instructions, that when executed by a device, perform a method further comprising:

(a) receiving, by a device, a request by the Data Requestor of an Data Requester's account;

(b) verifying the identity of the Data Requester; and (c) after verification of the identity of the Data Requester, creating the Data Requester's account.

14. The non-transitory computer-readable storage medium of claim 9, wherein the non-transitory computer-readable storage medium tangibly is encoded with computer-executable instructions, that when executed by a device, perform a method further comprising:

(a) creating the Data Contract; and (b) facilitating subscription to the Data Contract by the Data Owner.

15. The non-transitory computer-readable storage medium of claim 9, wherein the non-transitory computer-readable storage medium tangibly is encoded with computer-executable instructions, that when executed by a device, perform a method further comprising that, when the Data Requester requires the user data of the Data Owner to interact with a third party, a proxy gateway data flow allows the Data Requester to keep the user data of the Data Owner inaccessible from an internal system of the Data Requester.

16. The non-transitory computer-readable storage medium of claim 9, wherein the non-transitory computer-readable storage medium tangibly is encoded with computer-executable instructions, that when executed by a device, perform a method further comprising that, when the user data of the Data Owner is required to execute and/or is included in a query result set of a structured query language query by the Service Provider, performing the query against data sets containing reference to the user data of the Data Owner, while maintaining the user data of the Data Owner inaccessible from an internal system of the Data Requester.

17. A device comprising:

a processor configured to:

(a) receive a request for access to a user account of a Data Owner, the request originating from a Data Requestor, the user account comprising user data;

(b) identify a Data Contract, the Data Contract comprising information related to a networked relationship between the Data Owner, Data Requestor and the device, wherein the information related to a networked relationship between the Data Owner, Data Requestor and the device comprises (i) information regarding the ability for the Data Owner to specify a term or duration for which the Data Contract is valid or requires explicit approval at each use, (ii) information regarding one or more individuals, organizations and/or companies that are parties or participants in and to the Data Contract that allows for the Data Contract to be an N-way Data Contract, (iii) information regarding the Data Requestor describing authorized and acceptable use of the Data Contract, (iv) information regarding the ability for the Data Requestor and/or Data Owner to specify nature of data that will be housed under the Data Contact via a Data Record, (v) information regarding ability to notify one or more of the parties or participants in and to the Data Contract when the information within the Data Contract is updated, (vi) information regarding ability to perform event logging and to create an audit trail for when the data is accessed and used, and by whom and for what purpose, and (vii) information regarding ability to retrieve the data in one or more manners, wherein the one or more manners comprise at least one manner selected from the group consisting of (A) retrieval of the data in actual form, (B) retrieval of the data in masked and/or obfuscated for, and (C) retrieval of the data in tokenized representation form;

(c) identify, based on the Data Contract, a set of encryption keys, the set of encryption keys being part of a multi-key encryption scheme associated with the Data Contract, each encryption key in the set of encryption keys being respectively assigned to the Data Owner, Data Requestor and the device, wherein (i) the Data Owner has the ability to rescind access to the data under the Data Contract by withdrawing the encryption key assigned to the Data Owner, and (ii) the encryption key assigned to the device can prevent access to the data when circumstances are determined by the device for the prevention of access to the data;

(d) receive approval of the request;

(e) perform the multi-key encryption scheme by combining each encryption key based on the approval; and (f) facilitate, over a network, user account access to the Data Requestor based on the combination of each encryption key.

18. The device of claim 17, wherein the processor is further configured to:

(a) receive a request for the creation of the user account of the Data Owner; and (b) create the user account.

19. The device of claim 18, wherein the processor is further configured to verify the identity of the Data Owner before creating the user account.

20. The device of claim 17, wherein the request for access to a user account of a plurality of Data Owner is included within a request originating from the Data Requestor of a bulk upload for access to a plurality of Data Owners' user accounts.

21. The device of claim 17, wherein the processor is further configured to:

(a) receive, by a device, a request by the Data Requestor of an Data Requester's account;

(b) verify the identity of the Data Requester; and (c) after verification of the identity of the Data Requester, create the Data Requester's account.

22. The device of claim 17, wherein the processor is further configured to:

(a) create the Data Contract; and (b) facilitate subscription to the Data Contract by the Data Owner.

23. The device of claim 17, wherein the processor is further configured to, when the Data Requester requires the user data of the Data Owner to interact with a third party, a proxy gateway data flow allows the Data Requester to keep the user data of the Data Owner inaccessible from an internal system of the Data Requester.

24. The device of claim 17, wherein the processor is further configured to, when the user data of the Data Owner is required to execute and/or is included in a query result set of a structured query language query by the Service Provider, performing the query against data sets containing reference to the user data of the Data Owner, while maintaining the user data of the Data Owner inaccessible from an internal system of the Data Requester.

\* \* \* \* \*